United States Patent
Tomizawa et al.

(10) Patent No.: US 9,058,783 B2
(45) Date of Patent: Jun. 16, 2015

(54) LIQUID-CRYSTAL DISPLAY DEVICE

(75) Inventors: Kazunari Tomizawa, Osaka (JP); Yuichi Yoshida, Osaka (JP); Tomohiko Mori, Osaka (JP); Makoto Hasegawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/241,766

(22) PCT Filed: Aug. 28, 2012

(86) PCT No.: PCT/JP2012/071703
§ 371 (c)(1),
(2), (4) Date: Feb. 27, 2014

(87) PCT Pub. No.: WO2013/031770
PCT Pub. Date: Mar. 7, 2013

(65) Prior Publication Data
US 2014/0253422 A1    Sep. 11, 2014

(30) Foreign Application Priority Data
Aug. 31, 2011   (JP) .................................. 2011-189817

(51) Int. Cl.
*G09G 3/36* (2006.01)
*G02F 1/1335* (2006.01)

(52) U.S. Cl.
CPC ........ *G09G 3/3607* (2013.01); *G02F 1/133514* (2013.01); *G09G 2340/06* (2013.01); *G09G 2360/16* (2013.01); *G09G 2320/0242* (2013.01); *G09G 2320/028* (2013.01)

(58) Field of Classification Search
CPC .............. G02F 1/133514; G02F 2001/134345; G09G 3/3607; G09G 2320/028; G09G 2320/0242; G09G 2340/06; G09G 2360/16
See application file for complete search history.

(56) References Cited

U.S. PATENT DOCUMENTS 6,661,488 B1   12/2003   Takeda et al.
7,215,395 B2   5/2007    Kubo et al.
(Continued)

FOREIGN PATENT DOCUMENTS

| JP | 11-242225 A | 9/1999 |
|---|---|---|
| JP | 2003-043525 A | 2/2003 |
| JP | 2004-529396 A | 9/2004 |

OTHER PUBLICATIONS

English translation of Official Communication issued in corresponding International Application PCT/JP2012/071703, mailed on Mar. 13, 2014.
Official Communication issued in International Patent Application No. PCT/JP2012/071703, mailed on Oct. 2, 2012.
(Continued)

*Primary Examiner* — Abbas Abdulselam
(74) *Attorney, Agent, or Firm* — Keating & Bennett, LLP

(57) ABSTRACT

This liquid crystal display device (100) includes a pixel defined by a plurality of subpixels that includes red, green, blue and yellow subpixels (R, G, B, Ye). As long as the sum of respective luminances of all of the subpixels but the blue subpixel (B) falls within the range of 0% to 50% while the color displayed by the pixel is changing from the color blue in which the blue subpixel (B) is at the highest grayscale level and the other subpixels are at the lowest grayscale level into the color white in which all of those subpixels are at the highest grayscale level substantially without changing its hue, the yellow subpixel (Ye) starts to increase its grayscale level at a different timing, and/or has its grayscale level increased at a different ratio with respect to an increase in the pixel's luminance, from the red and green subpixels (R, G) do.

20 Claims, 18 Drawing Sheets

(56) References Cited

U.S. PATENT DOCUMENTS

| | | | |
|---|---|---|---|
| 7,268,757 | B2 | 9/2007 | Ben-David et al. |
| 8,576,261 | B2 * | 11/2013 | Yoshida et al. ............... 345/690 |
| 2010/0053235 | A1 | 3/2010 | Tomizawa et al. |

OTHER PUBLICATIONS

Pointer, "The Gamut of Real Surface Colours", Color Research and Application, vol. 5, No. 3, Fall 1980, pp. 145-155.

* cited by examiner (a)

(b)

(c)

LIQUID-CRYSTAL DISPLAY DEVICE

TECHNICAL FIELD

The present invention relates to a liquid crystal display device and more particularly relates to a multi-primary-color liquid crystal display device which conducts a display operation using four or more primary colors.

BACKGROUND ART

Liquid crystal display devices and various other types of display devices are currently used in a variety of applications. In a general display device, a single pixel consists of three subpixels respectively representing red, green and blue that are the three primary colors of light, thereby conducting a display operation in colors.

A conventional display device, however, can reproduce colors that fall within only a narrow range (which is usually called a "color reproduction range"), which is a problem. FIG. 30 shows the color reproduction range of a conventional display device that conducts a display operation using the three primary colors. Specifically, FIG. 30 shows an xy chromaticity diagram according to the XYZ color system, in which the triangle, formed by three points corresponding to the three primary colors of red, green and blue, represents the color reproduction range. Also plotted by crosses X in FIG. 30 are the surface colors of various objects existing in Nature, which were disclosed by Pointer (see Non-Patent Document No. 1). As can be seen from FIG. 30, there are some object colors that do not fall within the color reproduction range, and therefore, a display device that conducts a display operation using the three primary colors cannot reproduce some object colors.

Thus, in order to broaden the color reproduction range of display devices, a technique for increasing the number of primary colors used for display purposes to four or more has been proposed recently.

For example, Patent Document No. 1 discloses a liquid crystal display device 800 in which a single pixel P consists of six subpixels R, G, B, Ye, C, and M representing the colors red, green, blue, yellow, cyan, and magenta, respectively, as shown in FIG. 31. The color reproduction range of such a liquid crystal display device 800 is shown in FIG. 32. As shown in FIG. 32, the color reproduction range, represented by a hexagon of which the six vertices correspond to those six primary colors, covers almost all object colors. By increasing the number of primary colors for use in display in this manner, the color reproduction range can be broadened. In this description, a display device which carries out a display operation using four or more primary colors will be referred to herein as a "multi-primary-color display device" and a liquid crystal display device which carries out a display operation using four or more primary colors will be referred to herein as a "multi-primary-color liquid crystal display device". Meanwhile, a conventional general display device which carries out a display operation using the three primary colors will be referred to herein as a "three-primary-color display device" and a liquid crystal display device which carries out a display operation using the three primary colors will be referred to herein as a "three-primary-color liquid crystal display device".

A video signal input to a three-primary-color display device generally has an RGB format or a YCrCb format. A video signal in any of these formats has three parameters (i.e., is a so-called "three-dimensional signal"), and therefore, the luminances of the three primary colors (that are red, green and blue) for use to conduct a display operation are determined unequivocally.

For a multi-primary-color display device to perform a display operation, an image signal with a format for a three-primary-color display device needs to be converted into an image signal with more (i.e., four or more) parameters. Such an image signal representing four or more primary colors will be referred to herein as a "multi-primary-color image signal". Also, an image signal with a format for a three-primary-color display device, i.e., an image signal representing the three primary colors, will be referred to herein as a "three-primary-color image signal".

CITATION LIST

Patent Literature

Patent Document No. 1: PCT International Application Japanese National-Phase Publication No. 2004-529396

Non-Patent Literature

Non-Patent Document No. 1: M. R. Pointer, "The Gamut of Real Surface Colors," Color Research and Application, Vol. 5, No. 3, pp. 145-155 (1980)

SUMMARY OF INVENTION

Technical Problem

The present inventors carried out intensive researches on the relation between a technique for converting a three-primary-color image signal into a multi-primary-color image signal (which will be referred to herein as a "multi-primary-color conversion") and the display quality of a multi-primary-color liquid crystal display device. As a result, the present inventors discovered that by simply carrying out such a multi-primary-color conversion, the viewing angle characteristic would deteriorate when a pixel displayed a color close to the color blue. Specifically, the present inventors discovered that when the display screen was viewed obliquely, the colors represented by pixels looked more whitish than when the display screen was viewed straight on.

The present inventors perfected our invention in order to overcome these problems by minimizing such deterioration in viewing angle characteristic to be caused when pixels display colors close to the color blue in a liquid crystal display device which conducts a display operation in colors using four or more primary colors.

Solution to Problem

A liquid crystal display device according to an embodiment of the present invention includes a pixel which is defined by a plurality of subpixels that includes red, green, blue and yellow subpixels. As long as the sum of respective luminances of all of the subpixels but the blue subpixel falls within the range of 0% to 50% while the color displayed by the pixel is changing from the color blue in which the blue subpixel is at the highest grayscale level and the other subpixels are at the lowest grayscale level into the color white in which all of those subpixels are at the highest grayscale level substantially without changing its hue, the yellow subpixel starts to increase its grayscale level at a different timing, and/or has its grayscale level increased at a different ratio with respect to an increase in the pixel's luminance, from the red and green subpixels do.

In one preferred embodiment, while the color displayed by the pixel is changing from the color blue into the color white substantially without changing its hue, the red and green subpixels start to increase their grayscale levels at an earlier timing than the yellow subpixel starts to increase its own.

In one preferred embodiment, the sum of respective luminances of the red and green subpixels which are at the highest grayscale level is lower than the luminance of the yellow subpixel which is at the highest grayscale level.

In one preferred embodiment, while the color displayed by the pixel is changing from the color blue into the color white substantially without changing its hue, the red and green subpixels increase their grayscale levels at the same ratio with respect to an increase in the pixel's luminance.

In one preferred embodiment, while the color displayed by the pixel is changing from the color blue into the color white substantially without changing its hue, the yellow subpixel starts to increase its grayscale level after the red and green subpixels have reached the highest grayscale level.

In one preferred embodiment, while the color displayed by the pixel is changing from the color blue into the color white substantially without changing its hue, the yellow subpixel starts to increase its grayscale level before the red and green subpixels reach the highest grayscale level.

In one preferred embodiment, while the color displayed by the pixel is changing from the color blue into the color white substantially without changing its hue, the red and green subpixels increase their grayscale levels at mutually different ratios with respect to an increase in the pixel's luminance.

In one preferred embodiment, while the color displayed by the pixel is changing from the color blue into the color white substantially without changing its hue, the yellow subpixel starts to increase its grayscale level after one of the red and green subpixels has reached the highest grayscale level and before the other subpixel reaches the highest grayscale level.

In one preferred embodiment, while the color displayed by the pixel is changing from the color blue into the color white substantially without changing its hue, the yellow subpixel start to increase its grayscale level at an earlier timing than the red and green subpixels start to increase theirs.

In one preferred embodiment, the luminance of the yellow subpixel which is at the highest grayscale level is lower than the sum of respective luminances of the red and green subpixels which are at the highest grayscale level.

In one preferred embodiment, while the color displayed by the pixel is changing from the color blue into the color white substantially without changing its hue, the red and green subpixels start to increase their grayscale levels after the yellow subpixel has reached the highest grayscale level.

In one preferred embodiment, while the color displayed by the pixel is changing from the color blue into the color white substantially without changing its hue, the red and green subpixels increase their grayscale levels at the same ratio with respect to an increase in the pixel's luminance.

In one preferred embodiment, while the color displayed by the pixel is changing from the color blue into the color white substantially without changing its hue, at least one of the red and green subpixels starts to increase their grayscale levels before the yellow subpixel reaches the highest grayscale level.

In one preferred embodiment, while the color displayed by the pixel is changing from the color blue into the color white substantially without changing its hue, one of the red and green subpixels starts to increase its grayscale level before the yellow subpixel reaches the highest grayscale level, and the other subpixel starts to increase its grayscale level after the yellow subpixel has reached the highest grayscale level.

In one preferred embodiment, while the color displayed by the pixel is changing from the color blue into the color white substantially without changing its hue, both of the red and green subpixels start to increase their grayscale levels before the yellow subpixel reaches the highest grayscale level, and the red and green subpixels increase their grayscale levels at the same ratio with respect to an increase in the pixel's luminance.

In one preferred embodiment, while the color displayed by the pixel is changing from the color blue into the color white substantially without changing its hue, the yellow subpixel starts to increase its grayscale level at the same timing as the red and green subpixels start to increase theirs, and the yellow subpixel stops increasing its grayscale level once after having started increasing its own.

In one preferred embodiment, the plurality of subpixels further includes a cyan subpixel. While the color displayed by the pixel changes from the color blue into the color white substantially without changing its hue, the cyan subpixel starts to increase its grayscale level at the same timing as the red and green subpixels start to increase theirs, and the cyan subpixel increases its grayscale level at a different ratio with respect to an increase in the pixel's luminance from the red and green subpixels.

In one preferred embodiment, while the color displayed by the pixel is changing from the color blue into the color white substantially without changing its hue, the yellow subpixel starts to increase its grayscale level at the same timing as the red and green subpixels start to increase theirs, and the red and green subpixels stop increasing their grayscale levels once after having started increasing theirs.

In one preferred embodiment, the plurality of subpixels further includes a cyan subpixel. While the color displayed by the pixel changes from the color blue into the color white substantially without changing its hue, the cyan and yellow subpixels start to increase their grayscale levels at the same timing, and the cyan subpixel increases its grayscale level at a different ratio with respect to an increase in the pixel's luminance from the yellow subpixel.

Another liquid crystal display device according to the present invention includes a pixel which is defined by a plurality of subpixels that includes red, green, blue and yellow subpixels. While the color displayed by the pixel changes from the color blue in which the blue subpixel is at the highest grayscale level and the other subpixels are at the lowest grayscale level into the color white in which all of those subpixels are at the highest grayscale level substantially without changing its hue, the yellow subpixel starts to increase its grayscale level at a different timing from the red and green subpixels.

In one preferred embodiment, the liquid crystal display device of the present invention includes a signal converter which converts an input three-primary-color image signal into a multi-primary-color image signal representing four or more primary colors, and a liquid crystal display panel which receives the multi-primary-color image signal that has been generated by the signal converter.

In one preferred embodiment, supposing the number of primary colors for use to conduct a display operation is n, the signal converter gets the luminances of (n−3) out of the n primary colors by reference to a lookup table with the input video signal, and makes an arithmetic operation based on the luminances of the (n−3) primary colors, thereby calculating the luminances of the remaining three primary colors among the n primary colors.

In one preferred embodiment, the signal converter includes a lookup table memory which stores the lookup table and an arithmetic section which performs the arithmetic operation.

In one preferred embodiment, the liquid crystal display panel further includes a first substrate, a second substrate which faces the first substrate, and a vertical alignment liquid crystal layer which is interposed between the first and second substrates. Each of the plurality of subpixels includes a first electrode which is arranged on one side of the first substrate to front on the liquid crystal layer and a second electrode which is arranged on the second substrate and which faces the first electrode with the liquid crystal layer interposed between them. In each of the plurality of subpixels, when a predetermined voltage is applied to the liquid crystal layer, multiple domains in which liquid crystal molecules tilt in mutually different orientations are formed.

In one preferred embodiment, the liquid crystal display panel further includes first alignment control means which is arranged on one side of the liquid crystal layer closer to the first electrode and second alignment control means which is arranged on the other side of the liquid crystal layer closer to the second electrode.

In one preferred embodiment, the first alignment control means is a rib and the second alignment control means is a slit which has been cut through the second electrode.

In one preferred embodiment, the first alignment control means is a first rib and the second alignment control means is a second rib.

In one preferred embodiment, the first alignment control means is a first slit which has been cut through the first electrode and the second alignment control means is a second slit which has been cut through the second electrode.

In one preferred embodiment, the first electrode has at least one hole or notch which is located at a predetermined position. In each of the plurality of subpixels, when a predetermined voltage is applied to the liquid crystal layer, multiple liquid crystal domains, each having axisymmetric orientations, are formed.

Advantageous Effects of Invention

According to embodiments of the present invention, it is possible to prevent a liquid crystal display device which conducts a display operation in colors using four or more primary colors from causing deterioration in viewing angle characteristic when pixels display colors close to the color blue.

DESCRIPTION OF EMBODIMENTS

Hereinafter, embodiments of the present invention will be described with reference to the accompanying drawings. It should be noted that the present invention is in no way limited to the embodiments to be described below.

Figure 1:
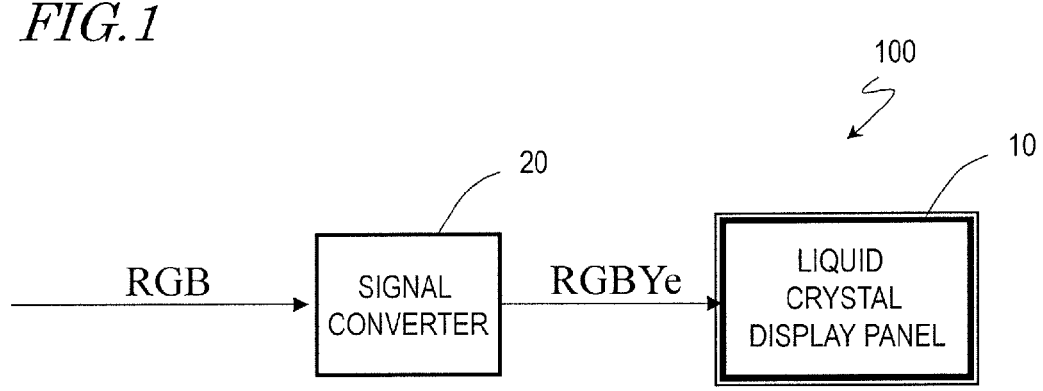
FIG. 1 A block diagram illustrating a liquid crystal display device 100 as a preferred embodiment of the present invention.

FIG. 1 illustrates a liquid crystal display device 100 as an embodiment of the present invention. As shown in FIG. 1, the liquid crystal display device 100 is a multi-primary-color liquid crystal display device which includes an liquid crystal display panel 10 and a signal converter 20 and which conducts a display operation using four or more primary colors.

Figure 2:
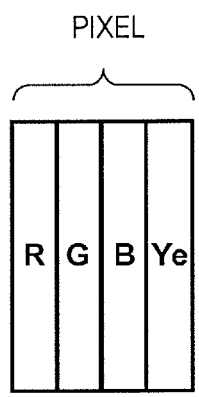
FIG. 2 Illustrates an exemplary configuration for a single pixel of the liquid crystal display device 100.

The liquid crystal display device 100 includes a plurality of pixels which are arranged in a matrix pattern. Each of those pixels is defined by a plurality of subpixels. FIG. 2 illustrates an exemplary configuration for a single pixel of the liquid crystal display device 100. In the example illustrated in FIG. 2, a single pixel is defined by red, green, blue, and yellow subpixels R, G, B and Ye representing the colors red, green, blue, and yellow, respectively.

Figure 3:
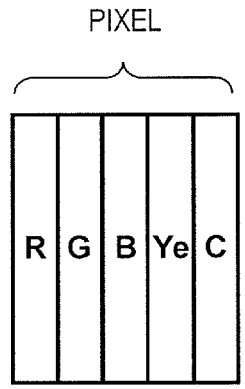
FIG. 3 Illustrates another exemplary configuration for a single pixel of the liquid crystal display device 100.

Even though a plurality of subpixels are supposed to be arranged in each pixel to form a single row and multiple columns in the example illustrated in FIG. 2, this is just an exemplary arrangement of subpixels and any other arrangement may be adopted as well. Alternatively, a plurality of subpixels may also be arranged to form multiple rows and a single column or multiple rows and multiple columns in each pixel. Also, although each pixel is supposed to be defined by four subpixels, namely, red, green, blue, and yellow subpixels R, G, B and Ye, in the example illustrated in FIG. 2, the number of subpixels that define each pixel does not have to be four. Rather, the plurality of subpixels that define each pixel has only to include red, green, blue, and yellow subpixels R, G, B and Ye. Thus, each pixel may also include five subpixels, namely, red, green, blue, yellow and cyan subpixels R, G, B, Ye and C, as shown in FIG. 3.

The signal converter 20 converts an input three-primary-color image signal into a multi-primary-color image signal representing four or more primary colors. For example, the signal converter 20 converts the three-primary-color image signal in an RGB format representing the respective luminances of the color red, green and blue into a multi-primary-color image signal representing the respective luminances of the colors red, green, blue, and yellow as shown in FIG. 1.

The liquid crystal display panel 10 receives the multi-primary-color image signal that has been generated by the signal converter 20 and colors represented by the multi-primary-color image signal received are displayed by the respective pixels. Any of various display modes may be used as the display mode of the liquid crystal display panel 10. For example, the MVA (multi-domain vertical alignment) mode and the CPA (continuous pinwheel alignment) mode may be used. As will be described later, the MVA or CPA mode panel includes a vertical alignment liquid crystal layer in which liquid crystal molecules are aligned perpendicularly to the substrate when no voltage is applied thereto, and those liquid crystal molecules tilt in multiple different directions in multiple domain in each subpixel when a voltage is applied thereto, thereby carrying out a wide viewing angle display operation.

In this embodiment, a three-primary-color image signal in the RGB format is supposed to be input to the signal converter 20. However, the three-primary-color image signal input to the signal converter 20 may also have any other format, which may be an XYZ format or a YCrCb format as well.

As already described, when a display operation is conducted using a multi-primary-color liquid crystal display device, a three-primary-color image signal is converted into a multi-primary-color image signal. However, if a color represented by an image signal in a format for a three-primary-color display device is expressed in four more primary colors, the luminances of the respective primary colors are not determined unequivocally but there are a lot of combinations of luminances. That is to say, it can be said that any color represented by pixels of a multi-primary-color liquid crystal display device has redundancy. The liquid crystal display device 100 of this embodiment uses such redundancy of colors, thereby minimizing deterioration in viewing angle characteristic when the pixels display a color close to the color blue. Hereinafter, this point will be described more specifically.

This liquid crystal display device 100 has a different subpixel lighting pattern when the color displayed by a pixel changes from the color blue into the color white substantially without changing its hue from a conventional multi-primary-color liquid crystal display device. In this description, the "color blue" refers herein to the color blue displayed by a pixel when the blue subpixel B is at the highest grayscale level while the other subpixels are at the lowest grayscale level. On the other hand, the "color white" refers herein to the color white displayed by a pixel when all of those subpixels are at the highest grayscale level. In the following description, the "color blue displayed by a pixel" and the "color white displayed by a pixel" will refer herein to such "color blue" and "color white" unless otherwise stated. Also, in this description, "substantially the same hue" refers herein to having a hue angle of within ±5 degrees in the L*a*b* color space.

In the liquid crystal display device 100 of this embodiment, as long as the sum of respective luminances of all of the subpixels but the blue subpixel falls within the range of 0% to 50% while the color displayed by a pixel is changing from the color blue into the color white substantially without changing its hue, the yellow subpixel Ye starts to increase its grayscale level at a different timing, and/or has its grayscale level increased at a different ratio with respect to an increase in the pixel's luminance, from the red and green subpixels R and G. As a result, the deterioration in viewing angle characteristic when a pixel displays a color close to the color blue can be suppressed as will be described later.

Figure 4:
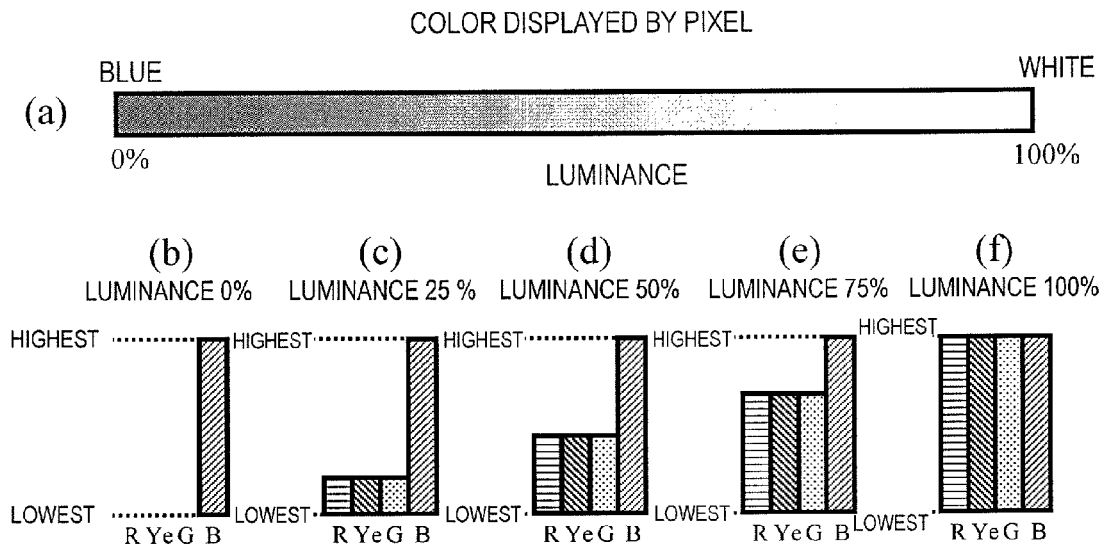
FIG. 4 Shows a lighting pattern according to Comparative Example 1, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 25%, 50%, 75% and 100%, respectively.

FIG. 4 shows a lighting pattern according to Comparative Example 1, in which each pixel is defined by four subpixels, namely, red, green, blue, and yellow subpixels R, G, B and Ye. FIG. 4(a) shows how the color displayed by a pixel changes with the sum of respective luminances of the subpixels other than the blue subpixel. On the other hand, FIGS. 4(b) through 4(f) show the grayscale levels of the red, green, blue, and yellow subpixels R, G, B and Ye when the sums of respective luminances of those subpixels other than the blue subpixel are 0%, 25%, 50%, 75% and 100%, respectively.

Comparative Example 1 shown in FIG. 4 has the simplest lighting pattern in a situation where the color displayed by a pixel changes from the color blue into the color white substantially without changing its hue. As can be seen from FIGS. 4(b) to 4(f), in this comparative example, all of those subpixels but the blue subpixel B, i.e., the red, green, and yellow subpixels R, G, and Ye, start to increase their grayscale levels at the same timing and have their grayscale levels increased at the same ratio with respect to an increase in the pixel's luminance.

First of all, when the sum of respective luminances of all of those subpixels but the blue subpixel is 0% (i.e., when the color blue is displayed by the pixel), the blue subpixel B is at the highest grayscale level, while the other subpixels, namely, red, green and yellow subpixels R, G and Ye, are at the lowest grayscale level as shown in FIG. 4(b). That is to say, in this situation, only the blue subpixel B is lit at the highest grayscale level, while the red, green and yellow subpixels R, G and Ye are not lit.

Next, when the pixel starts to increase its luminance, the red, green and yellow subpixels R, G and Ye also start to increase their grayscale levels as shown in FIGS. 4(c), 4 (d) and 4(e). As can be seen from FIGS. 4(c), 4(d) and 4(e), all of the red, green and yellow subpixels R, G and Ye increase their grayscale levels at the same ratio with respect to an increase in the pixel's luminance.

Thereafter, when the red, green and yellow subpixels R, G and Ye reach the highest grayscale level, the sum of respective luminances of those subpixels other than the blue subpixel becomes 100%, and the color displayed by the pixel becomes the color white (i.e., the color with the highest luminance). In such a situation, every subpixel is lit at the highest grayscale level as shown in FIG. 4(f).

If a lighting pattern such as that of this Comparative Example 1 is adopted, the viewing angle characteristic will deteriorate when the pixel displays a color close to the color blue. The reason will be described with reference to FIG. 5.

Figure 5:
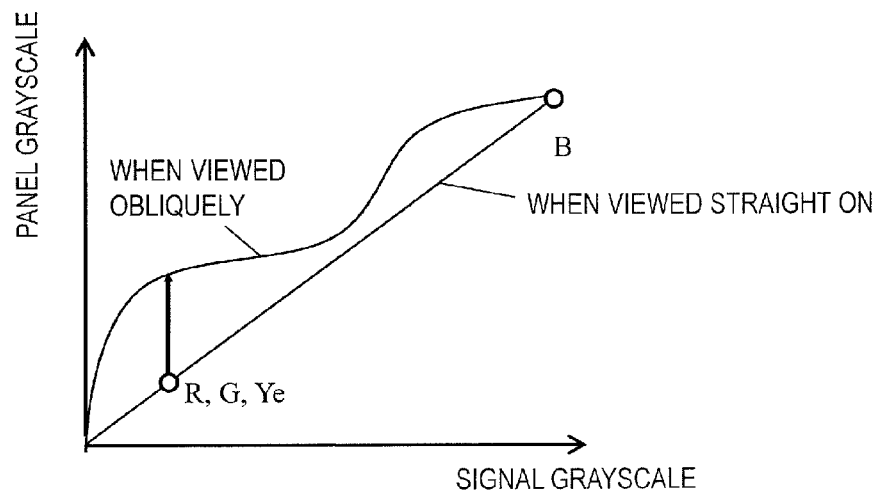
FIG. 5 A graph showing relations between the signal grayscale and panel grayscale in a multi-primary-color liquid crystal display device in two situations where its liquid crystal display panel is viewed straight on and viewed obliquely, respectively.

FIG. 5 is a graph showing how the grayscale levels of respective subpixels which are represented by a multi-primary-color image signal (i.e., signal grayscales) change with the grayscales into which the luminances of respective subpixels of a liquid crystal display panel that is conducting a display operation based on the multi-primary-color image signal have been converted (i.e., panel grayscales) in a multi-primary-color liquid crystal display device in two situations where the liquid crystal display panel is viewed straight on and viewed obliquely (e.g., from an oblique 60 degree direction), respectively.

As can be seen from FIG. 5, when the panel is viewed straight on, the signal grayscales agree with the panel grayscales, and therefore, the relation between the signal and panel grayscales is represented by a line. On the other hand, when the panel is viewed obliquely, the signal grayscales do not agree with the panel grayscales, the panel grayscales become higher than the signal grayscales, and therefore, the relation between the signal and panel grayscales is represented by a curve. The magnitude of shift of the curve from the line shown in FIG. 5 represents the magnitude of difference in grayscale level (corresponding to the magnitude of difference in luminance) between when the panel is viewed straight on and when the panel is viewed obliquely. As can be seen from the shape of the curve shown in FIG. 5, in a situation where the signal grayscale is relatively low, the grayscale level when the panel is viewed obliquely tends to increase more significantly (i.e., the luminance tends to increase to a larger degree) than in a situation where the signal grayscale is relatively high.

In FIG. 5, plotted are the grayscale levels of the respective subpixels in the lighting state shown in FIG. 4(c). Compared to when the panel is viewed straight on, the respective subpixels have higher panel grayscales when the panel is viewed obliquely. In this lighting state, however, the pixel is displaying a color close to the color blue, and therefore, the signal grayscale of the blue subpixel B is higher than that of the red, green and yellow subpixels R, G and Ye. That is why when the panel is viewed obliquely, the red, green and yellow subpixels R, G and Ye increase their panel grayscale to a greater degree than the blue subpixel B (which hardly increases its panel grayscale in the example shown in FIG. 5), and the red, green and yellow subpixels R, G and Ye increase their luminances at a higher ratio than the blue subpixel B does. As a result, the color close to the color blue which is being displayed by the pixel looks whitish when the panel is viewed obliquely.

As can be seen, if a lighting pattern such as the one of this Comparative Example 1 is adopted, every subpixel but the blue subpixel B will be lit at a relatively low grayscale level in a range where the pixel has a relatively low luminance (specifically, where the sum of respective luminances of all of those subpixels but the blue subpixel falls within the range of 0% to 50%), thus causing deterioration in viewing angle characteristic.

On the other hand, if the yellow subpixel Ye starts to increase its grayscale level at a different timing, and/or has its grayscale level increased at a different ratio with respect to an increase in the pixel's luminance, from the red and green subpixels R and G do as in the liquid crystal display device 100 of this embodiment, then some of those subpixels other than the blue subpixel B can be lit at a relatively high grayscale level in a range where the pixel's luminance is relatively low (specifically, where the sum of respective luminances of all of those subpixels but the blue subpixel falls within the range of 0% to 50%). As a result, the increase in the luminance of those subpixels can be checked when the panel is viewed obliquely. Consequently, the deterioration in viewing angle characteristic that would otherwise be caused when the pixel displays a color close to the color blue can be suppressed.

Hereinafter, more specific lighting patterns for this liquid crystal display device 100 will be described as illustrative examples.

Example 1

Figure 6:
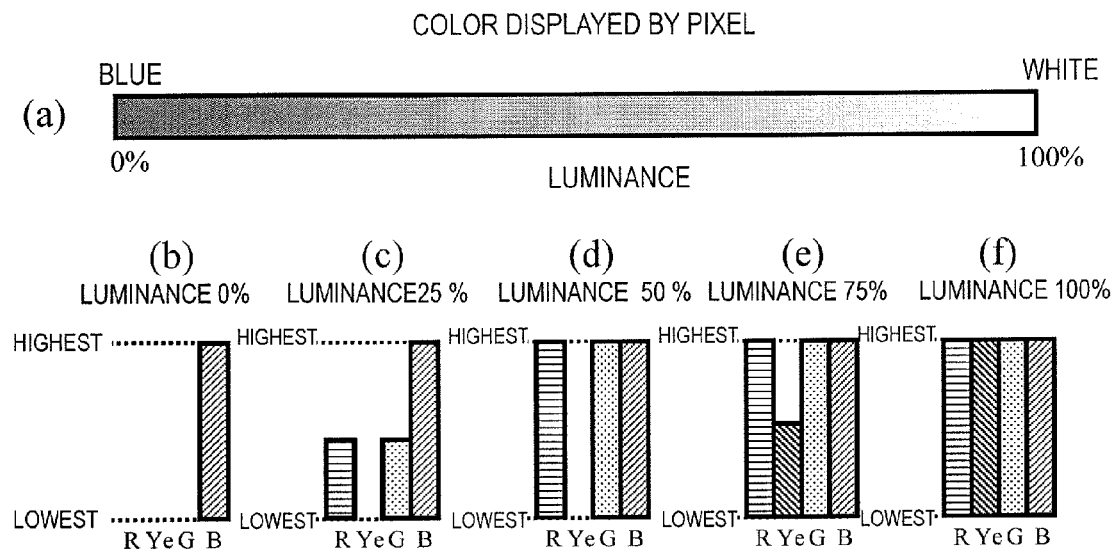
FIG. 6 Shows a lighting pattern according to Example 1, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 25%, 50%, 75% and 100%, respectively.

FIG. 6 shows a lighting pattern according to this example, in which each pixel is defined by four subpixels, namely, red, green, blue, and yellow subpixels R, G, B and Ye (the same statement will apply to Examples 2 to 8 to be described later). FIG. 6(a) shows how the color displayed by a pixel changes with the sum of respective luminances of the subpixels other than the blue subpixel. On the other hand, FIGS. 6(b) through 6(f) show the grayscale levels of the red, green, blue, and yellow subpixels R, G, B and Ye when the sums of respective luminances of those subpixels other than the blue subpixel are 0%, 25%, 50%, 75% and 100%, respectively.

As can be seen from FIGS. 6(b) to 6(f), in this example, the red and green subpixels R and G start to increase their grayscale levels at an earlier timing than the yellow subpixel Ye starts to increase its own.

First of all, when the sum of respective luminances of all of those subpixels but the blue subpixel is 0% (i.e., when the color blue is displayed by the pixel), the blue subpixel B is at the highest grayscale level, while the other subpixels, namely, red, green and yellow subpixels R, G and Ye, are at the lowest grayscale level as shown in FIG. 6(b). That is to say, in this situation, only the blue subpixel B is lit at the highest grayscale level, while the red, green and yellow subpixels R, G and Ye are not lit.

Next, when the pixel starts to increase its luminance, the red and green subpixels R and G also start to increase their grayscale levels as shown in FIGS. 6(c) and 6(d). On the other hand, the yellow subpixel Ye does not increase its grayscale level but remains unlit for a while even after the pixel has started to increase its luminance. As can be seen from FIGS. 6(c) and 6(d), the red and green subpixels R and G increase their grayscale levels at the same ratio with respect to an increase in the pixel's luminance.

Subsequently, after the red and green subpixels R and G have reached the highest grayscale level, the yellow subpixel Ye starts to increase its grayscale level as shown in FIG. 6(e).

Thereafter, when the yellow subpixel Ye reaches the highest grayscale level, the sum of respective luminances of those subpixels other than the blue subpixel becomes 100% to make the color displayed by the pixel white (i.e., the color with the highest luminance). At this point in time, every subpixel is lit at the highest grayscale level as shown in FIG. 6(f).

Figure 7:
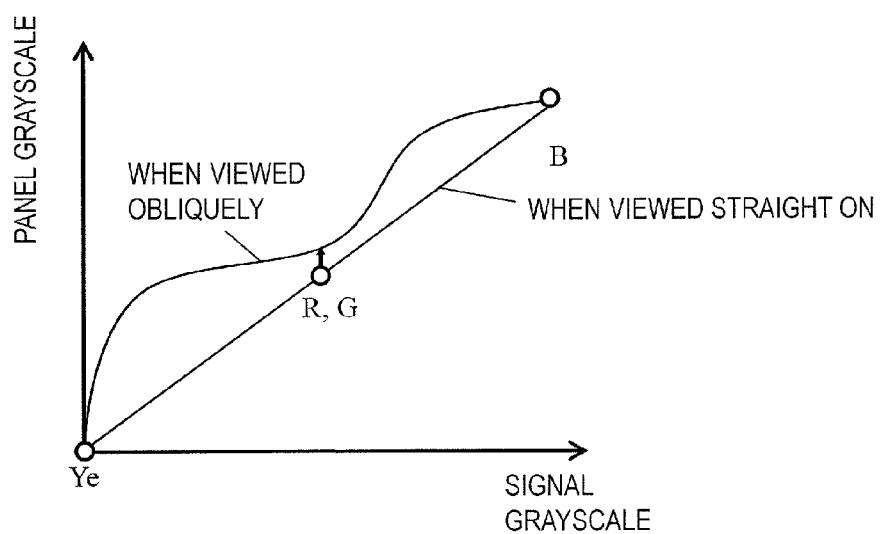
FIG. 7 A graph showing relations between the signal grayscale and panel grayscale in the liquid crystal display device 100 in two situations where its liquid crystal display panel is viewed straight on and viewed obliquely, respectively.

FIG. 7 shows how the signal grayscale changes with the panel grayscale in this liquid crystal display device 100 when the panel is viewed straight on and when the panel is viewed obliquely. In FIG. 7, plotted are the grayscale levels of the respective subpixels in the lighting state shown in FIG. 6(c). As described above, according to this example, the yellow subpixel Ye is not lit for a while even after the pixel has started to increase its luminance, and a color close to the color blue is expressed using the red and green subpixels R and G and the blue subpixel B which has already been lit at the highest grayscale level. That is why in the lighting state shown in FIG. 6(c), the red and green subpixels R and G have a higher signal grayscale than in the lighting state shown in FIG. 4(c) (as plotted in FIG. 5), because the yellow subpixel Ye has not been lit yet. For that reason, when the panel is viewed obliquely, the luminance of the red and green subpixels R and G (i.e., the increase in panel grayscale) increases less as shown in FIG. 7. Consequently, the color close to the color blue which is being displayed by the pixel hardly looks whitish even when viewed obliquely.

As can be seen, by adopting the lighting pattern of this example, deterioration in viewing angle characteristic when the pixel displays a color close to the color blue can be suppressed.

Example 2

Figure 8:
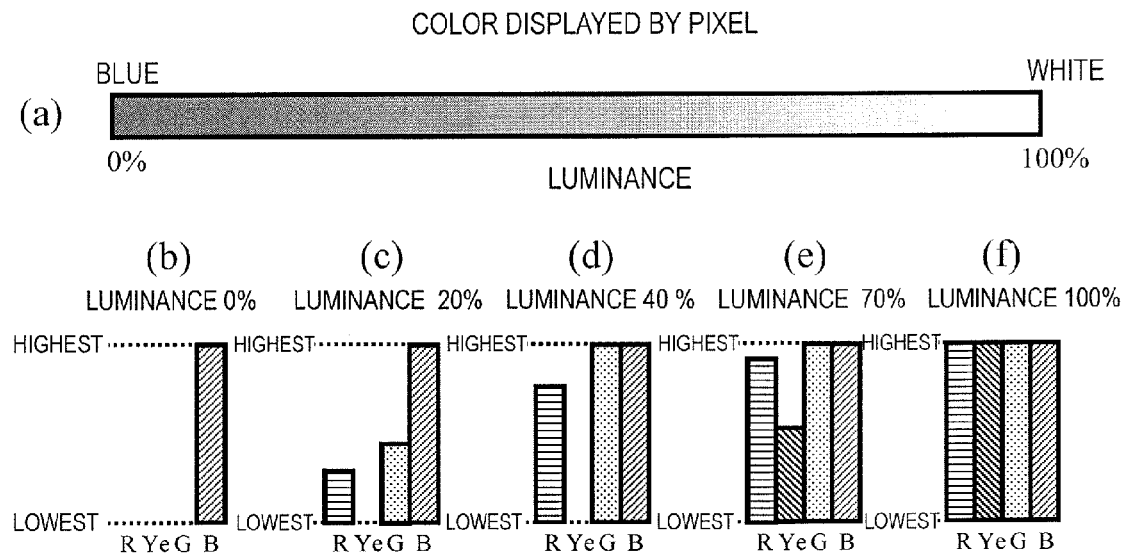
FIG. 8 Shows a lighting pattern according to Example 2, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 20%, 40%, 70% and 100%, respectively.

FIG. 8 shows a lighting pattern according to this example. FIG. 8(a) shows how the color displayed by a pixel changes with the sum of respective luminances of the subpixels other than the blue subpixel. On the other hand, FIGS. 8(b) through 8(f) show the grayscale levels of the red, green, blue, and yellow subpixels R, G, B and Ye when the sums of respective luminances of those subpixels other than the blue subpixel are 0%, 20%, 40%, 70% and 100%, respectively.

As can be seen from FIGS. 8(b) to 8(f), the red and green subpixels R and G start to increase their grayscale levels at an earlier timing than the yellow subpixel Ye starts to increase its own in this example, too.

First of all, when the sum of respective luminances of all of those subpixels but the blue subpixel is 0%, the blue subpixel B is at the highest grayscale level, while the other subpixels are at the lowest grayscale level as shown in FIG. 8(b). That is to say, in this situation, only the blue subpixel B is lit at the highest grayscale level, while the red, green and yellow subpixels R, G and Ye are not lit.

Next, when the pixel starts to increase its luminance, the red and green subpixels R and G also start to increase their grayscale levels as shown in FIGS. 8(c) and 8(d). On the other hand, the yellow subpixel Ye does not increase its grayscale level but remains unlit for a while even after the pixel has started to increase its luminance. In this example, the red and green subpixels R and G increase their grayscale levels at mutually different ratios as the pixel increases its luminance as can be seen from FIGS. 8(c) and 8(d). Specifically, in this example, the green subpixel G increases its grayscale level at a larger ratio than the red subpixel R does.

Subsequently, after one of the red and green subpixels R and G (e.g., the green subpixel G in this example) has reached the highest grayscale level and before the other subpixel (e.g., the red subpixel R in this example) reaches the highest grayscale level, the yellow subpixel Ye starts to increase its grayscale level as shown in FIG. 8(e).

Thereafter, when the red and yellow subpixels R and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 8(f).

Even when the lighting pattern of this example is adopted, the red and green subpixels R and G also start to increase their grayscale levels at an earlier timing than the yellow subpixel Ye starts to increase its own. That is why for the same reason as what has already been described for the lighting pattern of Example 1, deterioration in viewing angle characteristic that would otherwise be caused when the pixel displays a color close to the color blue can also be suppressed.

Furthermore, depending on the specifications of the liquid crystal display panel 10, the hue of the color yellow to be displayed when the red and green subpixels R and G are lit at the same grayscale level may be different from that of the color yellow to be displayed when the red, green and yellow subpixels R, G and Ye are lit at the same grayscale level. In that case, the hue of the color displayed by the pixel (i.e., a color close to the color blue) is suitably adjusted by increasing the grayscale levels of the red and green subpixels R and G at mutually different ratios with respect to an increase in the pixel's luminance as is done in this example. By making such adjustment, the hue can be kept sufficiently identical while the color displayed by the pixel changes from the color blue into the color white.

For example, if the color yellow to be displayed when the red and green subpixels R and G are lit at the same grayscale level looks more reddish than the color yellow to be displayed when the red, green and yellow subpixels R, G and Ye are lit at the same grayscale level, the green subpixel G suitably increases its grayscale level at a larger ratio than the red subpixel R does as shown in FIG. 8.

Conversely, if the color yellow to be displayed when the red and green subpixels R and G are lit at the same grayscale level looks more greenish than the color yellow to be displayed when the red, green and yellow subpixels R, G and Ye are lit at the same grayscale level, the red subpixel R suitably increases its grayscale level at a larger ratio than the green subpixel G does.

Example 3

Figure 9:
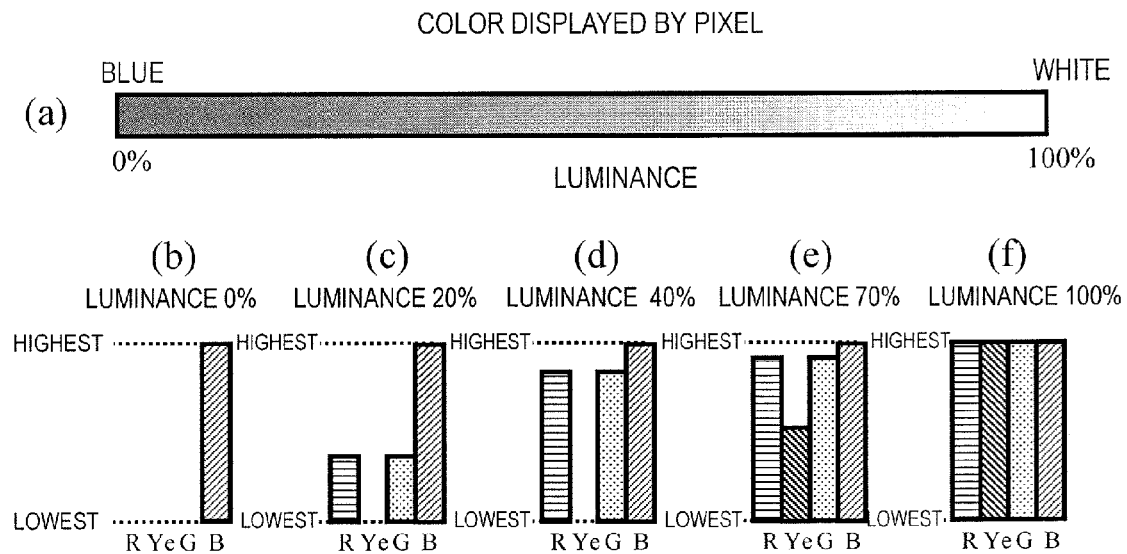
FIG. 9 Shows a lighting pattern according to Example 3, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 20%, 40%, 70% and 100%, respectively.

FIG. 9 shows a lighting pattern according to this example. FIG. 9(a) shows how the color displayed by a pixel changes with the sum of respective luminances of the subpixels other than the blue subpixel. On the other hand, FIGS. 9(b) through 9(f) show the grayscale levels of the red, green, blue, and yellow subpixels R, G, B and Ye when the sums of respective luminances of those subpixels other than the blue subpixel are 0%, 20%, 40%, 70% and 100%, respectively.

As can be seen from FIGS. 9(b) to 9(f), the red and green subpixels R and G start to increase their grayscale levels at an earlier timing than the yellow subpixel Ye starts to increase its own in this example, too.

First of all, when the sum of respective luminances of all of those subpixels but the blue subpixel is 0%, the blue subpixel B is at the highest grayscale level, while the other subpixels are at the lowest grayscale level as shown in FIG. 9(b). That is to say, in this situation, only the blue subpixel B is lit at the highest grayscale level, while the red, green and yellow subpixels R, G and Ye are not lit.

Next, when the pixel starts to increase its luminance, the red and green subpixels R and G also start to increase their grayscale levels as shown in FIGS. 9(c) and 9(d). On the other hand, the yellow subpixel Ye does not increase its grayscale level but remains unlit for a while even after the pixel has started to increase its luminance. In this example, the red and green subpixels R and G increase their grayscale levels at the same ratio with respect to an increase in the pixel's luminance as can be seen from FIGS. 9(c) and 9(d).

Subsequently, before the red and green subpixels R and G reach the highest grayscale level, the yellow subpixel Ye starts to increase its grayscale level in this example as shown in FIG. 9(e).

Thereafter, when the red, green and yellow subpixels R, G and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 9(f).

Even when the lighting pattern of this example is adopted, the red and green subpixels R and G also start to increase their grayscale levels at an earlier timing than the yellow subpixel Ye starts to increase its own. That is why for the same reason as what has already been described for the lighting pattern of Example 1, deterioration in viewing angle characteristic that would otherwise be caused when the pixel displays a color close to the color blue can also be suppressed.

On top of that, if the yellow subpixel Ye starts to increase its grayscale level as in this example before the red and green subpixels R and G reach the highest grayscale level, the luminance can be easily kept continuous even when the panel is viewed obliquely.

Example 4

Figure 10:
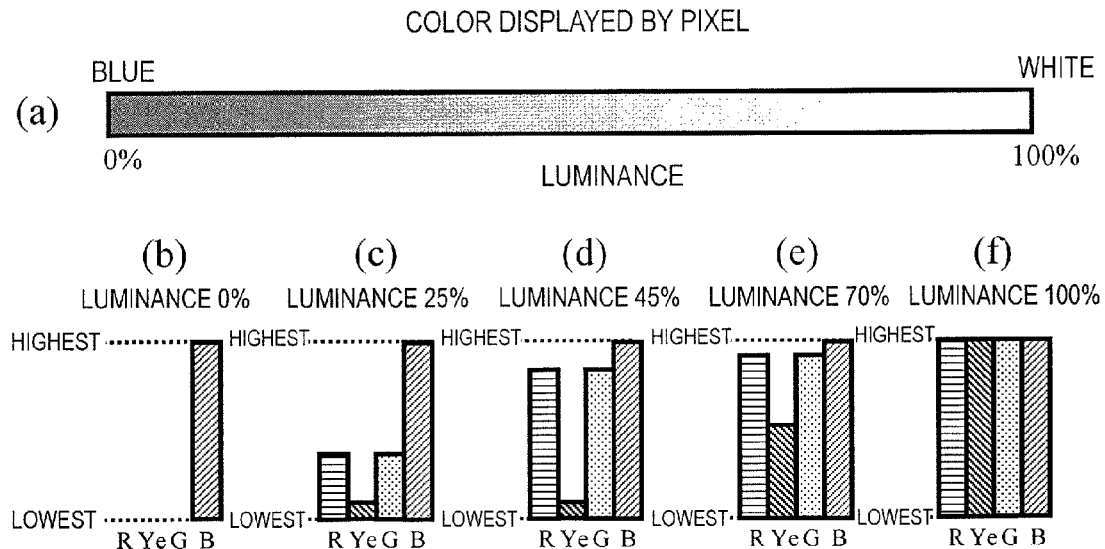
FIG. 10 Shows a lighting pattern according to Example 4, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 25%, 45%, 70% and 100%, respectively.

FIG. 10 shows a lighting pattern according to this example. FIG. 10(a) shows how the color displayed by a pixel changes with the sum of respective luminances of the subpixels other than the blue subpixel. On the other hand, FIGS. 10(*b*) through 10(*f*) show the grayscale levels of the red, green, blue, and yellow subpixels R, G, B and Ye when the sums of respective luminances of those subpixels other than the blue subpixel are 0%, 25%, 45%, 70% and 100%, respectively.

In this example, the yellow subpixel Ye starts to increase its grayscale level at the same timing as the red and green subpixels R and G start to increase theirs.

However, as the pixel increases its luminance, the yellow subpixel Ye increases its grayscale level at a different ratio from the red and green subpixels R and G.

First of all, when the sum of respective luminances of all of those subpixels but the blue subpixel is 0%, the blue subpixel B is at the highest grayscale level, while the other subpixels are at the lowest grayscale level as shown in FIG. 10(*b*). That is to say, in this situation, only the blue subpixel B is lit at the highest grayscale level, while the red, green and yellow subpixels R, G and Ye are not lit.

Next, when the pixel starts to increase its luminance, the red, green and yellow subpixels R, G and Ye also start to increase their grayscale levels as shown in FIG. 10(*c*). However, the yellow subpixel Ye once stops increasing its grayscale level after having started increasing it as shown in FIG. 10(*d*). That is why as the pixel increases its luminance, the yellow subpixel Ye increases its grayscale level at a different ratio from the red and green subpixels R and G. As can be seen from FIGS. 10(*c*) and 10(*d*), the red and green subpixels R and G increase their grayscale levels at the same ratio with respect to an increase in the pixel's luminance.

Subsequently, in this example, before the red and green subpixels R and G reach the highest grayscale level, the yellow subpixel Ye starts to increase its grayscale level again as shown in FIG. 10(*e*).

Thereafter, when the red, green and yellow subpixels R, G and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 10(*f*).

If the lighting pattern of this example is adopted, the yellow, red and green subpixels Ye, R and G start to increase their grayscale levels at the same time, but the yellow subpixel Ye once stops increasing its grayscale level after that. That is why in the lighting state shown in FIG. 10(*c*), the signal grayscale of the red and green subpixels R and G is higher than in the lighting state shown in FIG. 4(*c*) because the yellow subpixel Ye has stopped increasing its grayscale level. As a result, the luminance of the red and green subpixels R and G (i.e., panel grayscale) increases less when the panel is viewed obliquely, and therefore, the color close to the color blue which is being displayed by the pixel looks whitish much less often even when viewed obliquely. As can be seen, even if the lighting pattern of this example is adopted, the deterioration in viewing angle characteristic when the pixel displays such a color close to the color blue can also be suppressed.

In addition, if the yellow subpixel Ye is lit vaguely when the red and green subpixels R and G are lit and if the yellow subpixel Ye starts to increase its grayscale level again before the red and green subpixels R and G reach the highest grayscale level as is done in this example, the luminance can be easily kept continuous when the panel is viewed obliquely.

Example 5

Figure 11:
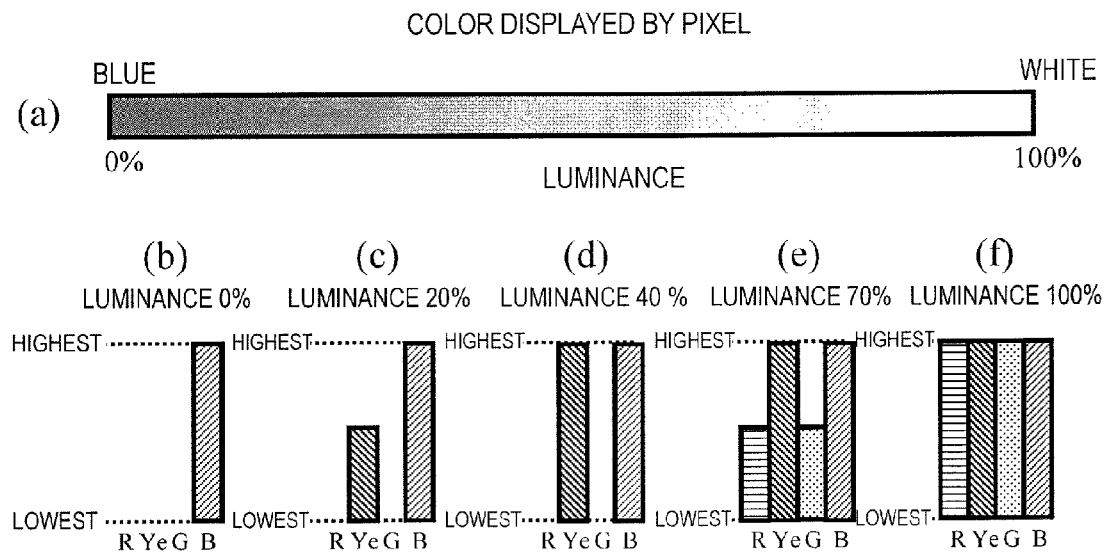
FIG. 11 Shows a lighting pattern according to Example 5, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 20%, 40%, 70% and 100%, respectively.

FIG. 11 shows a lighting pattern according to this example. FIG. 11(*a*) shows how the color displayed by a pixel changes with the sum of respective luminances of the subpixels other than the blue subpixel. On the other hand, FIGS. 11(*b*) through 11(*f*) show the grayscale levels of the red, green, blue, and yellow subpixels R, G, B and Ye when the sums of respective luminances of those subpixels other than the blue subpixel are 0%, 20%, 40%, 70% and 100%, respectively.

As can be seen from FIGS. 11(*b*) to 11(*f*), in this example, the yellow subpixel Ye starts to increase its grayscale level at an earlier timing than the red and green subpixels R and G start to increase theirs.

First of all, when the sum of respective luminances of all of those subpixels but the blue subpixel is 0%, the blue subpixel B is at the highest grayscale level, while the other subpixels are at the lowest grayscale level as shown in FIG. 11(*b*). That is to say, in this situation, only the blue subpixel B is lit at the highest grayscale level, while the red, green and yellow subpixels R, G and Ye are not lit.

Next, when the pixel starts to increase its luminance, the yellow subpixel Ye also starts to increase its grayscale level as shown in FIGS. 11(*c*) and 11(*d*). On the other hand, the red and green subpixels R and G do not increase their grayscale levels but remain unlit for a while even after the pixel has started to increase its luminance.

Subsequently, after the yellow subpixel Ye has reached the highest grayscale level, the red and green subpixels R and G start to increase their grayscale levels as shown in FIG. 11(*e*). As can be seen from FIG. 11(*e*), the red and green subpixels R and G increase their grayscale levels at the same ratio with respect to an increase in the pixel's luminance.

Thereafter, when the red and green subpixels R and G reach the highest grayscale level, the sum of respective luminances of those subpixels other than the blue subpixel becomes 100% to make the color displayed by the pixel white (i.e., the color with the highest luminance). At this point in time, every subpixel is lit at the highest grayscale level as shown in FIG. 11(*f*).

As described above, according to this example, the red and green subpixels R and G are not lit for a while even after the pixel has started to increase its luminance, and a color close to the color blue is expressed using the yellow subpixel Ye and the blue subpixel B which has already been lit at the highest grayscale level. That is why in the lighting state shown in FIG. 11(*c*), the yellow subpixel Ye has a higher signal grayscale than in the lighting state shown in FIG. 4(*c*) (as plotted in FIG. 5), because the red and green subpixels R and G have not been lit yet. For that reason, when the panel is viewed obliquely, the luminance of the yellow subpixel Ye (i.e., the panel grayscale) increases less. Consequently, the color close to the color blue which is being displayed by the pixel hardly looks whitish even when viewed obliquely.

As can be seen, by adopting the lighting pattern of this example, deterioration in viewing angle characteristic when the pixel displays a color close to the color blue can be suppressed.

Also, if the luminance of the yellow subpixel Ye which is at the highest grayscale level is lower than the sum of the respective luminances of the red and green subpixels R and G which are at the highest grayscale level, the lighting pattern of this example (or the lighting pattern of any of Examples 6 to 8 to be described below) is preferred to the lighting patterns of Examples 1 to 4 described above. The reason is that in such a situation where the luminance of the yellow subpixel Ye which is at the highest grayscale level is lower than the sum of the respective luminances of the red and green subpixels R and G which are at the highest grayscale level, expressiveness at low luminances can be increased (i.e., the difference in luminance between pixels can be defined at a narrower step)

by lighting the yellow subpixel Ye earlier than the red and green subpixels R and G. In addition, by lighting the subpixel with the lower luminance earlier at those low luminances, a relatively high grayscale level can also be used even at those low luminances. Since those subpixels at high grayscale levels would rarely exhibit outstandingly high luminances even when viewed obliquely as shown in FIG. 5, the viewing angle characteristic at those low luminances can be further improved by lighting the subpixel with the lower luminance earlier (i.e., either the yellow subpixel Ye or the red and green subpixels R and G which has the lower luminance at the highest grayscale level).

Conversely, if the sum of the respective luminances of the red and green subpixels R and G which are at the highest grayscale level is lower than the luminance of the yellow subpixel Ye which is at the highest grayscale level, the lighting patterns of Examples 1 to 4 described above is preferred to the lighting pattern of this Example 5. The reason is that in such a situation where the sum of the respective luminances of the red and green subpixels R and G which are at the highest grayscale level is lower than the luminance of the yellow subpixel Ye which is at the highest grayscale level, expressiveness and viewing angle characteristic at low luminances can be increased or improved by lighting the red and green subpixels R and G earlier than the yellow subpixel Ye (or by using only the red and green subpixels R and G).

Example 6

Figure 12:
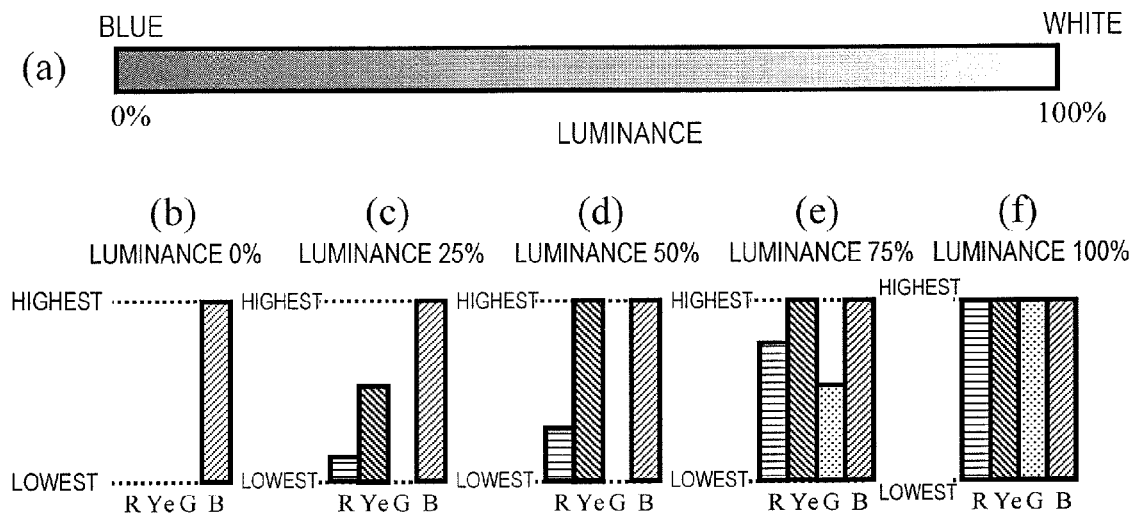
FIG. 12 Shows a lighting pattern according to Example 6, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 25%, 50%, 75% and 100%, respectively.

FIG. 12 shows a lighting pattern according to this example. FIG. 12(a) shows how the color displayed by a pixel changes with the sum of respective luminances of the subpixels other than the blue subpixel. On the other hand, FIGS. 12(b) through 12(f) show the grayscale levels of the red, green, blue, and yellow subpixels R, G, B and Ye when the sums of respective luminances of those subpixels other than the blue subpixel are 0%, 25%, 50%, 75% and 100%, respectively.

As can be seen from FIGS. 12(b) to 12(f), in this example, the yellow subpixel Ye also starts to increase its grayscale level at earlier timing than the red and green subpixels R and G start to increase theirs.

First of all, when the sum of respective luminances of all of those subpixels but the blue subpixel is 0%, the blue subpixel B is at the highest grayscale level, while the other subpixels are at the lowest grayscale level as shown in FIG. 12(b). That is to say, in this situation, only the blue subpixel B is lit at the highest grayscale level, while the red, green and yellow subpixels R, G and Ye are not lit.

Next, when the pixel starts to increase its luminance, the yellow subpixel Ye also starts to increase its grayscale level and then the red subpixel R soon starts to increase its grayscale level as shown in FIGS. 12(c) and 12(d). In this manner, according to this example, before the yellow subpixel Ye reaches the highest grayscale level, one of the red and green subpixels R and G (e.g., the red subpixel R in this example) starts to increase its grayscale level. On the other hand, the green subpixel G does not increase its grayscale level but remains unlit for a while even after the pixel has started to increase its luminance.

Subsequently, after the yellow subpixel Ye has reached the highest grayscale level, the other of the red and green subpixels R and G (e.g., the green subpixel G in this example) starts to increase its grayscale level as shown in FIG. 12(e).

Thereafter, when the red and green subpixels R and G reach the highest grayscale level, the sum of respective luminances of those subpixels other than the blue subpixel becomes 100% to make the color displayed by the pixel white. At this point in time, every subpixel is lit at the highest grayscale level as shown in FIG. 12(f).

Even when the lighting pattern of this example is adopted, the yellow subpixel Ye also starts to increase its grayscale level at an earlier timing than the red and green subpixels R and G start to increase theirs. That is why for the same reason as what has already been described for the lighting pattern of Example 5, deterioration in viewing angle characteristic that would otherwise be caused when the pixel displays a color close to the color blue can also be suppressed.

Furthermore, depending on the specifications of the liquid crystal display panel 10, the hue of the color yellow to be displayed when the yellow subpixel Ye is lit may be different from that of the color yellow to be displayed when the red, green and yellow subpixels R, G and Ye are lit at the same grayscale level. In that case, the hue of the color displayed by the pixel (i.e., a color close to the color blue) is suitably adjusted by starting to increase the grayscale levels of the red and green subpixels R and G at mutually different timings as is done in this example. By making such adjustment, the hue can be kept sufficiently identical while the color displayed by the pixel changes from the color blue into the color white.

For example, if the color yellow to be displayed when the yellow subpixel Ye is lit looks more greenish than the color yellow to be displayed when the red, green and yellow subpixels R, G and Ye are lit at the same grayscale level, the red subpixel R suitably starts to increase its grayscale level at an earlier timing than the green subpixel G starts to increase its own as shown in FIG. 12.

Conversely, if the color yellow to be displayed when the yellow subpixel Ye is lit looks more reddish than the color yellow to be displayed when the red, green and yellow subpixels R, G and Ye are lit at the same grayscale level, the green subpixel G suitably starts to increase its grayscale level at an earlier timing than the red subpixel R starts to increase its own.

Example 7

Figure 13:
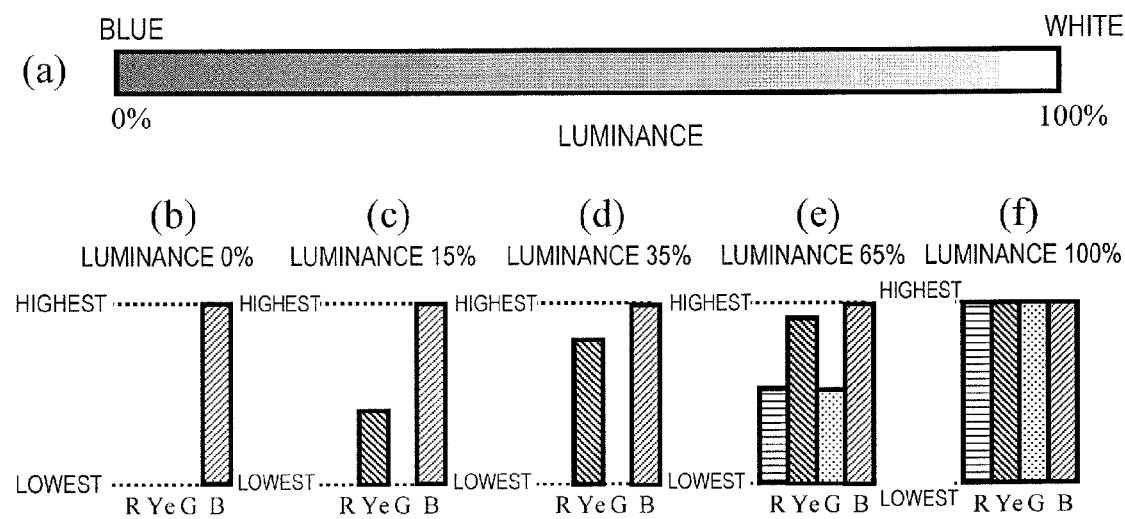
FIG. 13 Shows a lighting pattern according to Example 7, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 15%, 35%, 65% and 100%, respectively.

FIG. 13 shows a lighting pattern according to this example. FIG. 13(a) shows how the color displayed by a pixel changes with the sum of respective luminances of the subpixels other than the blue subpixel. On the other hand, FIGS. 13(b) through 13(f) show the grayscale levels of the red, green, blue, and yellow subpixels R, G, B and Ye when the sums of respective luminances of those subpixels other than the blue subpixel are 0%, 15%, 35%, 65% and 100%, respectively.

As can be seen from FIGS. 13(b) to 13(f), in this example, the yellow subpixel Ye also starts to increase its grayscale level at an earlier timing than the red and green subpixels R and G start to increase theirs.

First of all, when the sum of respective luminances of all of those subpixels but the blue subpixel is 0%, the blue subpixel B is at the highest grayscale level, while the other subpixels are at the lowest grayscale level as shown in FIG. 13(b). That is to say, in this situation, only the blue subpixel B is lit at the highest grayscale level, while the red, green and yellow subpixels R, G and Ye are not lit.

Next, when the pixel starts to increase its luminance, the yellow subpixel Ye also starts to increase its grayscale level as shown in FIGS. 13(c) and 13(d). On the other hand, the red and green subpixels R and G do not increase their grayscale levels but remain unlit for a while even after the pixel has started to increase its luminance.

Subsequently, before the yellow subpixel Ye reaches the highest grayscale level, the red and green subpixels R and G start to increase their grayscale levels in this example as shown in FIG. 13(e). The red and green subpixels R and G increase their grayscale levels at the same ratio with respect to an increase in the pixel's luminance.

Thereafter, when the red, green and yellow subpixels R, G and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 13(f).

Even when the lighting pattern of this example is adopted, the yellow subpixel Ye also starts to increase its grayscale level at an earlier timing than the red and green subpixels R and G start to increase theirs. That is why for the same reason as what has already been described for the lighting pattern of Example 5, deterioration in viewing angle characteristic that would otherwise be caused when the pixel displays a color close to the color blue can also be suppressed.

On top of that, if the red and green subpixels R and G start to increase their grayscale levels as in this example before the yellow subpixel Ye reaches the highest grayscale level, the luminance can be easily kept continuous even when the panel is viewed obliquely.

Example 8

Figure 14:
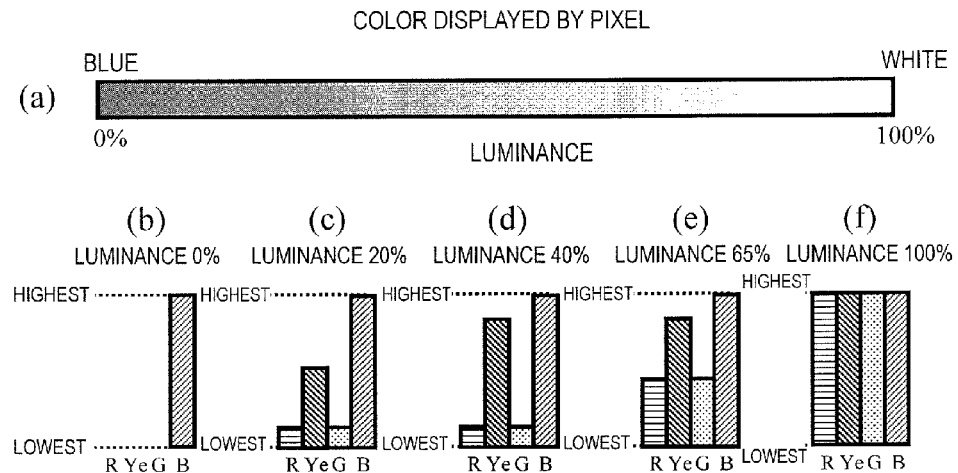
FIG. 14 Shows a lighting pattern according to Example 8, wherein (a) shows how the color displayed by a pixel changes with the sum of respective luminances of the subpixels other than a blue subpixel, and (b) through (f) show the grayscale levels of red, green, blue, and yellow subpixels R, G, B and Ye when the sums of respective luminances of those subpixels other than the blue subpixel are 0%, 20%, 40%, 65% and 100%, respectively.

FIG. 14 shows a lighting pattern according to this example. FIG. 14(a) shows how the color displayed by a pixel changes with the sum of respective luminances of the subpixels other than the blue subpixel. On the other hand, FIGS. 14(b) through 14(f) show the grayscale levels of the red, green, blue, and yellow subpixels R, G, B and Ye when the sums of respective luminances of those subpixels other than the blue subpixel are 0%, 20%, 40%, 65% and 100%, respectively.

In this example, the yellow subpixel Ye starts to increase its grayscale level at the same timing as the red and green subpixels R and G start to increase theirs. However, as the pixel increases its luminance, the yellow subpixel Ye increases its grayscale level at a different ratio from the red and green subpixels R and G.

First of all, when the sum of respective luminances of all of those subpixels but the blue subpixel is 0%, the blue subpixel B is at the highest grayscale level, while the other subpixels are at the lowest grayscale level as shown in FIG. 14(b). That is to say, in this situation, only the blue subpixel B is lit at the highest grayscale level, while the red, green and yellow subpixels R, G and Ye are not lit.

Next, when the pixel starts to increase its luminance, the red, green and yellow subpixels R, G and Ye also start to increase their grayscale levels as shown in FIG. 14(c). However, the red and green subpixels R and G once stop increasing their grayscale levels after having started increasing them as shown in FIG. 14(d). That is why as the pixel increases its luminance, the yellow subpixel Ye increases its grayscale level at a different ratio from the red and green subpixels R and G.

Subsequently, in this example, before the yellow subpixel Ye reaches the highest grayscale level, the red and green subpixels R and G start to increase their grayscale levels again as shown in FIG. 14(e).

Thereafter, when the red, green, and yellow subpixels R, G and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 14(f).

If the lighting pattern of this example is adopted, the yellow, red and green subpixels Ye, R and G start to increase their grayscale levels at the same time, but the red and green subpixels R and G once stop increasing their grayscale levels after that. That is why in the lighting state shown in FIG. 14(c), the signal grayscale of the yellow subpixel Ye is higher than in the lighting state shown in FIG. 4(c) because the red and green subpixels R and G have stopped increasing their grayscale levels. As a result, the luminance of the yellow subpixel Ye (i.e., panel grayscale) increases less when the panel is viewed obliquely, and therefore, the color close to the color blue which is being displayed by the pixel looks whitish much less often even when viewed obliquely. As can be seen, even if the lighting pattern of this example is adopted, the deterioration in viewing angle characteristic when the pixel displays such a color close to the color blue can also be suppressed.

In addition, if the yellow subpixel Ye is lit vaguely when the red and green subpixels R and G are lit and if the yellow subpixel Ye starts to increase its grayscale level again before the red and green subpixels R and G reach the highest grayscale level as is done in this example, the luminance can be easily kept continuous when the panel is viewed obliquely.

Example 9

Before a lighting pattern according to this example is described, a lighting pattern according to Comparative Example 2 will be described.

Figure 15:
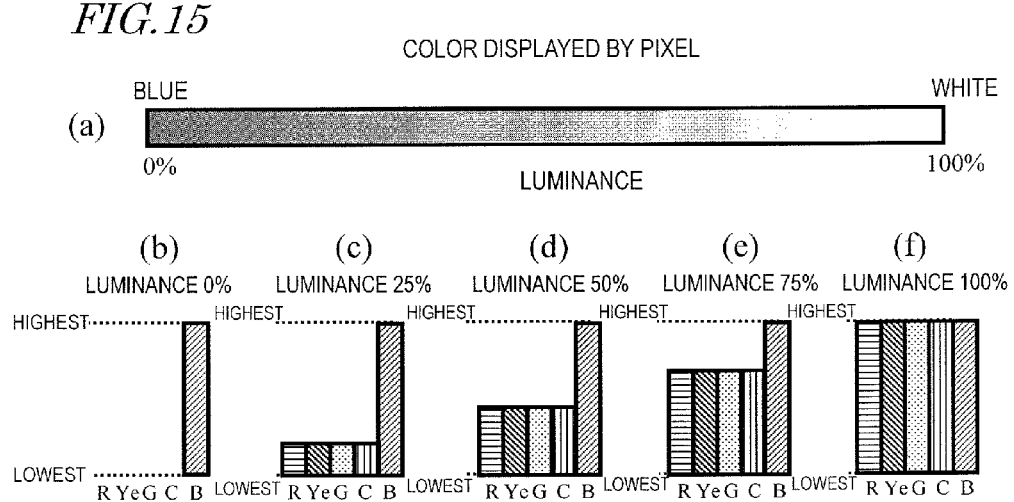
FIG. 15 Shows a lighting pattern according to Comparative Example 2, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 25%, 50%, 75% and 100%, respectively.

FIG. 15 shows a lighting pattern according to Comparative Example 2, in which each pixel is defined by five subpixels, namely, red, green, blue, yellow, and cyan subpixels R, G, B, Ye and C. FIG. 15(a) shows how the color displayed by a pixel changes with the sum of respective luminances of the subpixels other than the blue subpixel. On the other hand, FIGS. 15(b) through 15(f) show the grayscale levels of the red, green, blue, yellow and cyan subpixels R, G, B, Ye and C when the sums of respective luminances of those subpixels other than the blue subpixel are 0%, 25%, 50%, 75% and 100%, respectively.

Comparative Example 2 shown in FIG. 15 has the simplest lighting pattern in a situation where the color displayed by a pixel changes from the color blue into the color white substantially without changing its hue as in Comparative Example 1. As can be seen from FIGS. 15(b) to 15(f), in this comparative example, all of those subpixels but the blue subpixel B, i.e., the red, green, yellow and cyan subpixels R, G, Ye and C, start to increase their grayscale levels at the same timing and have their grayscale levels increased at the same ratio with respect to an increase in the pixel's luminance.

First of all, when the sum of respective luminances of all of those subpixels but the blue subpixel is 0%, the blue subpixel B is at the highest grayscale level, while the other subpixels, namely, red, green, yellow and cyan subpixels R, G, Ye and C, are at the lowest grayscale level as shown in FIG. 15(b). That is to say, in this situation, only the blue subpixel B is lit at the highest grayscale level, while the red, green, yellow and cyan subpixels R, G, Ye and C are not lit.

Next, when the pixel starts to increase its luminance, the red, green, yellow and cyan subpixels R, G, Ye and C also start to increase their grayscale levels as shown in FIGS. 15(c), 15(d) and 15(e). As can be seen from FIGS. 15(c), 15(d) and 15(e), all of the red, green, yellow and cyan subpixels R, G, Ye and C increase their grayscale levels at the same ratio with respect to an increase in the pixel's luminance.

Thereafter, when the red, green, yellow and cyan subpixels R, G, Ye and C reach the highest grayscale level, the sum of respective luminances of those subpixels other than the blue subpixel becomes 100% to make the color displayed by the pixel white. At this point in time, every subpixel is lit at the highest grayscale level as shown in FIG. 15(f).

If a lighting pattern such as that of this Comparative Example 2 is adopted, the viewing angle characteristic will also deteriorate when the pixel displays a color close to the color blue for the same reason as what has already been described for Comparative Example 1.

Figure 16:
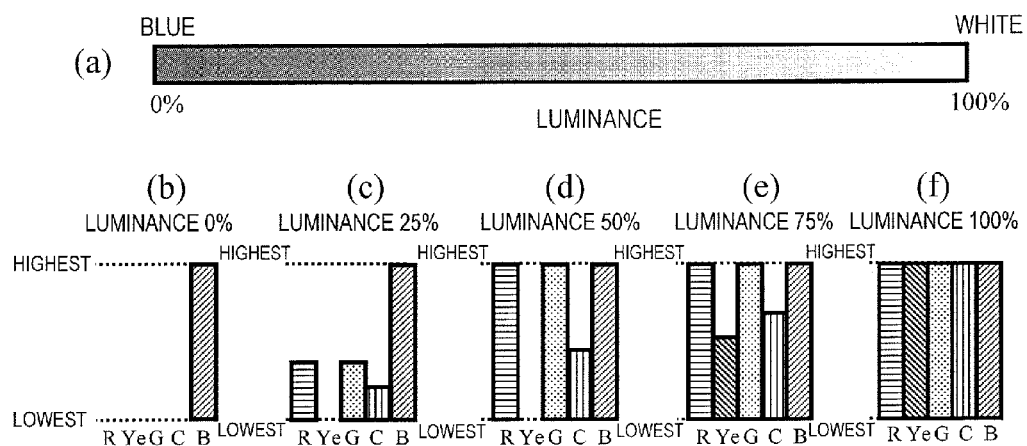
FIG. 16 Shows a lighting pattern according to Example 9, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 25%, 50%, 75% and 100%, respectively.

FIG. 16 shows a lighting pattern according to this example, in which each pixel is defined by five subpixels, namely, red, green, blue, yellow and cyan subpixels R, G, B, Ye and C (the same statement will apply to Examples 10 to 14 to be described later). FIG. 16(a) shows how the color displayed by a pixel changes with the sum of respective luminances of the subpixels other than the blue subpixel. On the other hand, FIGS. 16(b) through 16(f) show the grayscale levels of the red, green, blue, yellow and cyan subpixels R, G, B, Ye and C when the sums of respective luminances of those subpixels other than the blue subpixel are 0%, 25%, 50%, 75% and 100%, respectively.

As can be seen from FIGS. 16(b) to 16(f), in this example, the red and green subpixels R and G start to increase their grayscale levels at an earlier timing than the yellow subpixel Ye starts to increase its own. On the other hand, the cyan subpixel C starts to increase its grayscale level at the same timing as the red and green subpixels R and G start to increase theirs.

First of all, when the sum of respective luminances of all of those subpixels but the blue subpixel is 0%, the blue subpixel B is at the highest grayscale level, while the other subpixels, namely, red, green, yellow and cyan subpixels R, G, Ye and C, are at the lowest grayscale level as shown in FIG. 16(b). That is to say, in this situation, only the blue subpixel B is lit at the highest grayscale level, while the red, green, yellow and cyan subpixels R, G, Ye and C are not lit.

Next, when the pixel starts to increase its luminance, the red, green and cyan subpixels R, G and C also start to increase their grayscale levels as shown in FIGS. 16(c) and 16(d). On the other hand, the yellow subpixel Ye does not increase its grayscale level but remains unlit for a while even after the pixel has started to increase its luminance. As can be seen from FIGS. 16(c) and 16(d), the red and green subpixels R and G increase their grayscale levels at the same ratio with respect to an increase in the pixel's luminance. On the other hand, as the pixel increases its luminance, the cyan subpixel C increases its grayscale level at a different ratio from the red and green subpixels R and G do. Specifically, the cyan subpixel C increases its grayscale level at a smaller ratio than the red and green subpixels R and G do.

Subsequently, after the red and green subpixels R and G have reached the highest grayscale level and before the cyan subpixel C reaches the highest grayscale level, the yellow subpixel Ye starts to increase its grayscale level as shown in FIG. 16(e).

Thereafter, when the cyan and yellow subpixels C and Ye reach the highest grayscale level, the sum of respective luminances of those subpixels other than the blue subpixel becomes 100% to make the color displayed by the pixel white (i.e., color with the highest luminance). At this point in time, every subpixel is lit at the highest grayscale level as shown in FIG. 16(f).

As described above, according to this example, the yellow subpixel Ye is not lit for a while even after the pixel has started to increase its luminance, and a color close to the color blue is expressed using the red, green and cyan subpixels R, G and C and the blue subpixel B which has already been lit at the highest grayscale level. That is why in the lighting state shown in FIG. 16(c), the red and green subpixels R and G have a higher signal grayscale than in the lighting state shown in FIG. 15(c), because the yellow subpixel Ye has not been lit yet. For that reason, when the panel is viewed obliquely, the luminance of the red and green subpixels R and G (i.e., the panel grayscale) increases less. Consequently, the color close to the color blue which is being displayed by the pixel hardly looks whitish even when viewed obliquely.

As can be seen, by adopting the lighting pattern of this example, deterioration in viewing angle characteristic when the pixel displays a color close to the color blue can be suppressed.

Example 10

Figure 17:
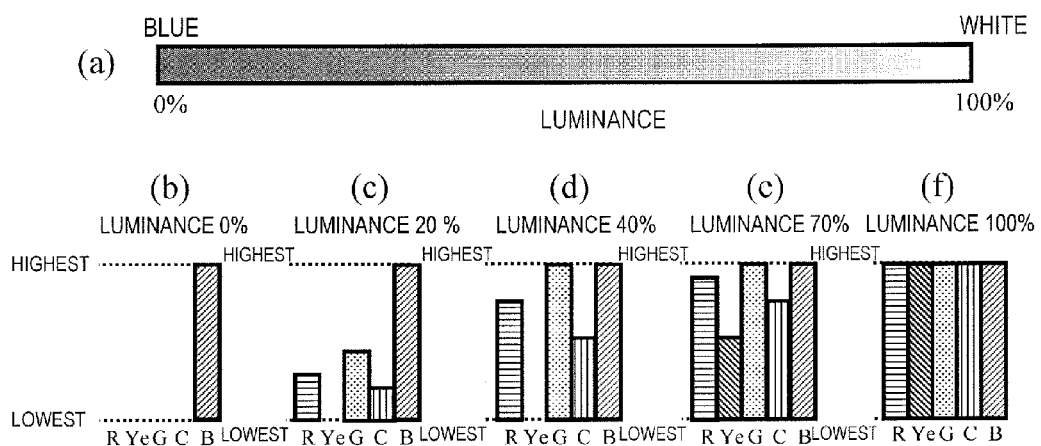
FIG. 17 Shows a lighting pattern according to Example 10, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 20%, 40%, 70% and 100%, respectively.

FIG. 17 shows a lighting pattern according to this example. FIG. 17(a) shows how the color displayed by a pixel changes with the sum of respective luminances of the subpixels other than the blue subpixel. On the other hand, FIGS. 17(b) through 17(f) show the grayscale levels of the red, green, blue, yellow and cyan subpixels R, G, B, Ye and C when the sums of respective luminances of those subpixels other than the blue subpixel are 0%, 20%, 40%, 70% and 100%, respectively.

As can be seen from FIGS. 17(b) to 17(f), in this example, the red and green subpixels R and G also start to increase their grayscale levels at an earlier timing than the yellow subpixel Ye starts to increase its own. On the other hand, the cyan subpixel C starts to increase its grayscale level at the same timing as the red and green subpixels R and G start to increase theirs.

First of all, when the sum of respective luminances of all of those subpixels but the blue subpixel is 0%, the blue subpixel B is at the highest grayscale level, while the other subpixels are at the lowest grayscale level as shown in FIG. 17(b). That is to say, in this situation, only the blue subpixel B is lit at the highest grayscale level, while the red, green, yellow and cyan subpixels R, G, Ye and C are not lit.

Next, when the pixel starts to increase its luminance, the red, green and cyan subpixels R, G and C also start to increase their grayscale levels as shown in FIGS. 17(c) and 17(d). On the other hand, the yellow subpixel Ye does not increase its grayscale level but remains unlit for a while even after the pixel has started to increase its luminance. As can be seen from FIGS. 17(c) and 17(d), in this example, the red and green subpixels R and G increase their grayscale levels at mutually different ratios as the pixel increases its luminance. In this example, the green subpixel G increases its grayscale level at a larger ratio than the red subpixel R does. Also, as the pixel increases its luminance, the cyan subpixel C increases its grayscale level at a different ratio from the red and green subpixels R and G do. Specifically, the cyan subpixel C increases its grayscale level at a smaller ratio than the red and green subpixels R and G do.

Subsequently, after one of the red and green subpixels R and G (e.g., the green subpixel G in this example) has reached the highest grayscale level and before the other subpixel (e.g., the red subpixel R in this example) reaches the highest grayscale level (and before the cyan subpixel C reaches the highest grayscale level), the yellow subpixel Ye starts to increase its grayscale level as shown in FIG. 17(e).

Thereafter, when the red, cyan, and yellow subpixels R, C and Ye reach the highest grayscale level, the sum of respective luminances of those subpixels other than the blue subpixel becomes 100% to make the color displayed by the pixel white. At this point in time, every subpixel is lit at the highest grayscale level as shown in FIG. 17(f).

Even when the lighting pattern of this example is adopted, the red and green subpixels R and G also start to increase their grayscale levels at an earlier timing than the yellow subpixel Ye starts to increase its own. That is why for the same reason as what has already been described for the lighting pattern of Example 9, deterioration in viewing angle characteristic that would otherwise be caused when the pixel displays a color close to the color blue can also be suppressed.

Furthermore, depending on the specifications of the liquid crystal display panel 10, the hue of the color yellow to be displayed when the red and green subpixels R and G are lit at the same grayscale level may be different from that of the color yellow to be displayed when the red, green and yellow subpixels R, G and Ye are lit at the same grayscale level. In that case, the hue of the color displayed by the pixel (i.e., a color close to the color blue) is suitably adjusted by increasing the grayscale levels of the red and green subpixels R and G at mutually different ratios with respect to an increase in the pixel's luminance as is done in this example. By making such adjustment, the hue can be kept sufficiently identical while the color displayed by the pixel changes from the color blue into the color white.

For example, if the color yellow to be displayed when the red and green subpixels R and G are lit at the same grayscale level looks more reddish than the color yellow to be displayed when the red, green and yellow subpixels R, G and Ye are lit at the same grayscale level, the green subpixel G suitably increases its grayscale level at a larger ratio than the red subpixel R does as shown in FIG. 17.

Conversely, if the color yellow to be displayed when the red and green subpixels R and G are lit at the same grayscale level looks more greenish than the color yellow to be displayed when the red, green and yellow subpixels R, G and Ye are lit at the same grayscale level, the red subpixel R suitably increases its grayscale level at a larger ratio than the green subpixel G does.

Example 11

Figure 18:
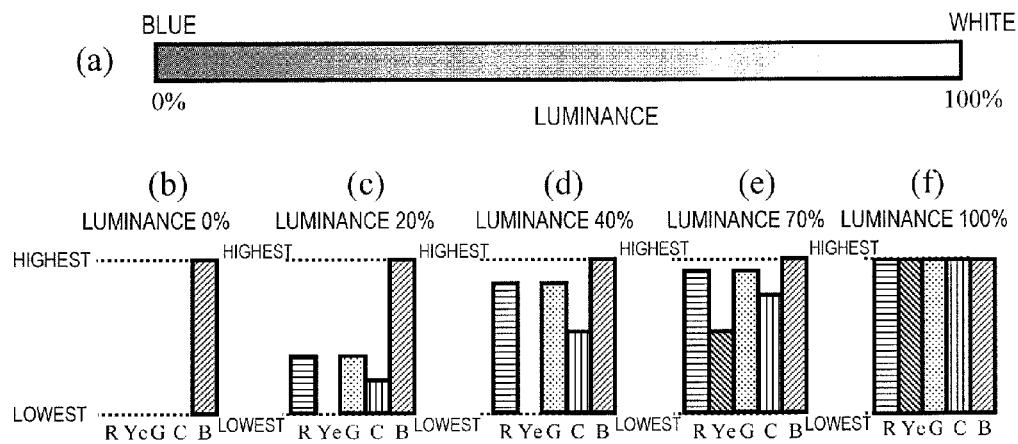
FIG. 18 Shows a lighting pattern according to Example 11, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 20%, 40%, 70% and 100%, respectively.

FIG. 18 shows a lighting pattern according to this example. FIG. 18(a) shows how the color displayed by a pixel changes with the sum of respective luminances of the subpixels other than the blue subpixel. On the other hand, FIGS. 18(b) through 18(f) show the grayscale levels of the red, green, blue, yellow and cyan subpixels R, G, B, Ye and C when the sums of respective luminances of those subpixels other than the blue subpixel are 0%, 20%, 40%, 70% and 100%, respectively.

As can be seen from FIGS. 18(b) to 18(f), in this example, the red and green subpixels R and G start to increase their grayscale levels at an earlier timing than the yellow subpixel Ye starts to increase its own. On the other hand, the cyan subpixel C starts to increase its grayscale level at the same timing as the red and green subpixels R and G start to increase theirs.

First of all, when the sum of respective luminances of all of those subpixels but the blue subpixel is 0%, the blue subpixel B is at the highest grayscale level, while the other subpixels are at the lowest grayscale level as shown in FIG. 18(b). That is to say, in this situation, only the blue subpixel B is lit at the highest grayscale level, while the red, green, yellow and cyan subpixels R, G, Ye and C are not lit.

Next, when the pixel starts to increase its luminance, the red, green and cyan subpixels R, G and C also start to increase their grayscale levels as shown in FIGS. 18(c) and 18(d). On the other hand, the yellow subpixel Ye does not increase its grayscale level but remains unlit for a while even after the pixel has started to increase its luminance. As can be seen from FIGS. 18(c) and 18(d), the red and green subpixels R and G increase their grayscale levels at the same ratio with respect to an increase in the pixel's luminance. On the other hand, as the pixel increases its luminance, the cyan subpixel C increases its grayscale level at a different ratio from the red and green subpixels R and G do. Specifically, the cyan subpixel C increases its grayscale level at a smaller ratio than the red and green subpixels R and G do.

Subsequently, before the red and green subpixels R and G reach the highest grayscale level (and naturally before the cyan subpixel C reaches the highest grayscale level), the yellow subpixel Ye starts to increase its grayscale level as shown in FIG. 18(e).

Thereafter, when the red, green, yellow and cyan subpixels R, G, Ye and C reach the highest grayscale level, the sum of respective luminances of those subpixels other than the blue subpixel becomes 100% to make the color displayed by the pixel white. At this point in time, every subpixel is lit at the highest grayscale level as shown in FIG. 18(f).

Even when the lighting pattern of this example is adopted, the red and green subpixels R and G also start to increase their grayscale levels at an earlier timing than the yellow subpixel Ye starts to increase its own. That is why for the same reason as what has already been described for the lighting pattern of Example 9, deterioration in viewing angle characteristic that would otherwise be caused when the pixel displays a color close to the color blue can also be suppressed.

On top of that, if the yellow subpixel Ye starts to increase its grayscale level as in this example before the red and green subpixels R and G reach the highest grayscale level, the luminance can be easily kept continuous even when the panel is viewed obliquely.

Example 12

Figure 19:
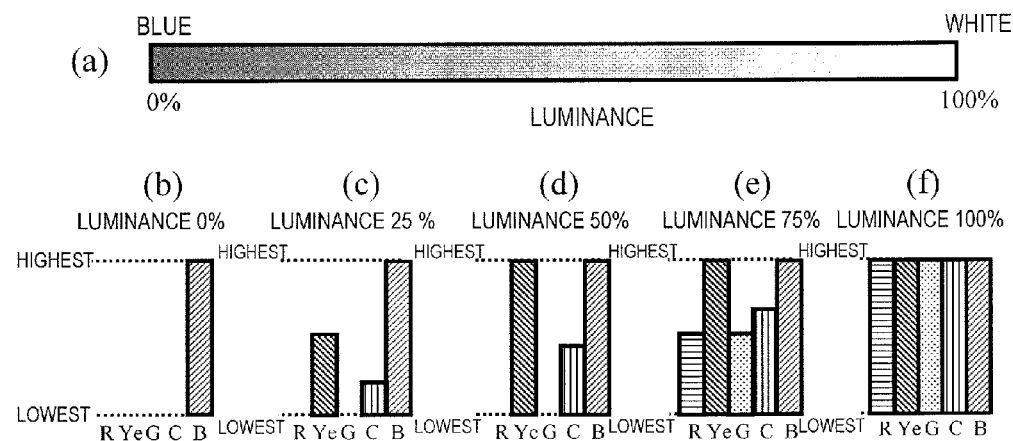
FIG. 19 Shows a lighting pattern according to Example 12, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 25%, 50%, 75% and 100%, respectively.

FIG. 19 shows a lighting pattern according to this example. FIG. 19(a) shows how the color displayed by a pixel changes with the sum of respective luminances of the subpixels other than the blue subpixel. On the other hand, FIGS. 19(b) through 19(f) show the grayscale levels of the red, green, blue, yellow and cyan subpixels R, G, B, Ye and C when the sums of respective luminances of those subpixels other than the blue subpixel are 0%, 25%, 50%, 75% and 100%, respectively.

As can be seen from FIGS. 19(b) to 19(f), in this example, the yellow subpixel Ye starts to increase its grayscale level at an earlier timing than the red and green subpixels R and G start to increase theirs. On the other hand, the cyan subpixel C starts to increase its grayscale level at the same timing as the yellow subpixel Ye starts to increase its own.

First of all, when the sum of respective luminances of all of those subpixels but the blue subpixel is 0%, the blue subpixel B is at the highest grayscale level, while the other subpixels are at the lowest grayscale level as shown in FIG. 19(b). That is to say, in this situation, only the blue subpixel B is lit at the highest grayscale level, while the red, green, yellow and cyan subpixels R, G, Ye and C are not lit.

Next, when the pixel starts to increase its luminance, the yellow and cyan subpixels Ye and C also start to increase their grayscale levels as shown in FIGS. 19(c) and 19(d). On the other hand, the red and green subpixels R and G do not increase their grayscale levels but remain unlit for a while even after the pixel has started to increase its luminance. As can be seen from FIGS. 19(c) and 19(d), the cyan and yellow subpixels C and Ye increase their grayscale levels at mutually different ratios as the pixel increases its luminance. Specifically, the cyan subpixel C increases its grayscale level at a smaller ratio than the yellow subpixel Ye does.

Subsequently, after the yellow subpixel Ye has reached the highest grayscale level and before the cyan subpixel C reaches the highest grayscale level, the red and green subpixels R and G start to increase their grayscale levels as shown in FIG. 19(e). As can be seen from FIG. 19(e), the red and green subpixels R and G increase their grayscale levels at the same ratio with respect to an increase in the pixel's luminance.

Thereafter, when the red, green, and cyan subpixels R, G, and C reach the highest grayscale level, the sum of respective luminances of those subpixels other than the blue subpixel becomes 100% to make the color displayed by the pixel white (i.e., the color with the highest luminance). At this point in time, every subpixel is lit at the highest grayscale level as shown in FIG. 19(f).

As described above, according to this example, the red and green subpixels R and G are not lit for a while even after the pixel has started to increase its luminance, and a color close to the color blue is expressed using the yellow and cyan subpixels Ye and C and the blue subpixel B which has already been lit at the highest grayscale level. That is why in the lighting state shown in FIG. 19(c), the yellow subpixel Ye has a higher signal grayscale than in the lighting state shown in FIG. 15(c), because the red and green subpixels R and G have not been lit yet. For that reason, when the panel is viewed obliquely, the luminance of the yellow subpixel Ye (i.e., the panel grayscale) increases less. Consequently, the color close to the color blue which is being displayed by the pixel hardly looks whitish even when viewed obliquely.

As can be seen, by adopting the lighting pattern of this example, deterioration in viewing angle characteristic when the pixel displays a color close to the color blue can be suppressed.

Also, if the luminance of the yellow subpixel Ye which is at the highest grayscale level is lower than the sum of the respective luminances of the red and green subpixels R and G which are at the highest grayscale level, the lighting pattern of this example (or the lighting pattern of any of Examples 13 and 14 to be described below) is preferred to the lighting patterns of Examples 9 to 11 described above. The reason is that in such a situation where the luminance of the yellow subpixel Ye which is at the highest grayscale level is lower than the sum of the respective luminances of the red and green subpixels R and G which are at the highest grayscale level, expressiveness at low luminances can be increased (i.e., the difference in luminance between pixels can be defined at a narrower step) and the viewing angle characteristic at low luminances can be further improved by lighting the yellow subpixel Ye earlier than the red and green subpixels R and G.

Conversely, if the sum of the respective luminances of the red and green subpixels R and G which are at the highest grayscale level is lower than the luminance of the yellow subpixel Ye which is at the highest grayscale level, the lighting patterns of Examples 9 to 11 described above is preferred to the lighting pattern of this Example 12. The reason is that in such a situation where the sum of the respective luminances of the red and green subpixels R and G which are at the highest grayscale level is lower than the luminance of the yellow subpixel Ye which is at the highest grayscale level, expressiveness and viewing angle characteristic at low luminances can be increased or improved by lighting the red and green subpixels R and G earlier than the yellow subpixel Ye.

Example 13

Figure 20:
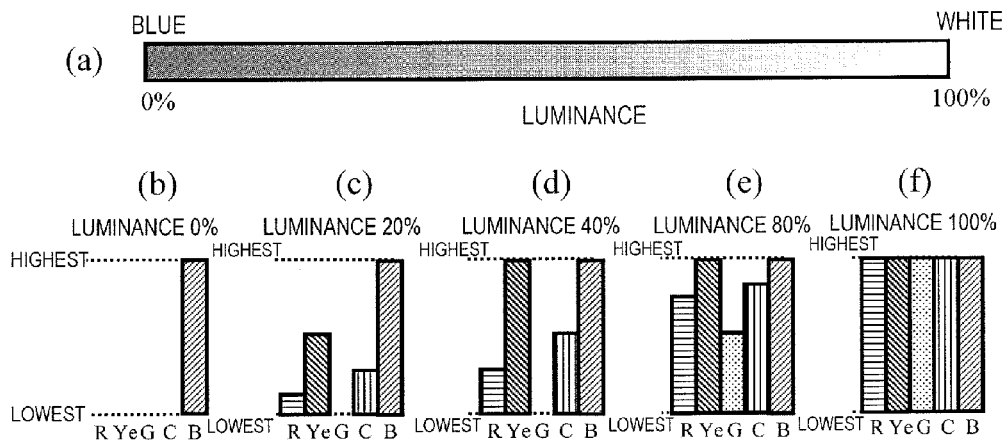
FIG. 20 Shows a lighting pattern according to Example 13, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 20%, 40%, 80% and 100%, respectively.

FIG. 20 shows a lighting pattern according to this example. FIG. 20(a) shows how the color displayed by a pixel changes with the sum of respective luminances of the subpixels other than the blue subpixel. On the other hand, FIGS. 20(b) through 20(f) show the grayscale levels of the red, green, blue, yellow and cyan subpixels R, G, B, Ye and C when the sums of respective luminances of those subpixels other than the blue subpixel are 0%, 20%, 40%, 80% and 100%, respectively.

As can be seen from FIGS. 20(b) to 20(f), in this example, the yellow subpixel Ye starts to increase its grayscale level at an earlier timing than the red and green subpixels R and G start to increase theirs. On the other hand, the cyan subpixel C starts to increase its grayscale level at the same timing as the yellow subpixel Ye starts to increase its own.

First of all, when the sum of respective luminances of all of those subpixels but the blue subpixel is 0%, the blue subpixel B is at the highest grayscale level, while the other subpixels are at the lowest grayscale level as shown in FIG. 20(b). That is to say, in this situation, only the blue subpixel B is lit at the highest grayscale level, while the red, green, yellow and cyan subpixels R, G, Ye and C are not lit.

Next, when the pixel starts to increase its luminance, the yellow and cyan subpixels Ye and C also start to increase their grayscale levels and then the red subpixel R soon starts to increase its grayscale level as shown in FIGS. 20(c) and 20(d). In this manner, according to this example, before the yellow subpixel Ye reaches the highest grayscale level, one of the red and green subpixels R and G (e.g., the red subpixel R in this example) starts to increase its grayscale level. On the other hand, the green subpixel G does not increase its grayscale level but remains unlit for a while even after the pixel has started to increase its luminance. Meanwhile, as the pixel increases its luminance, the cyan subpixel C increases its grayscale level at a different ratio from the yellow subpixel Ye. Specifically, the cyan subpixel C increases its grayscale level at a smaller ratio than the yellow subpixel Ye does.

Subsequently, after the yellow subpixel Ye has reached the highest grayscale level and before the cyan subpixel C reaches the highest grayscale level, the other of the red and green subpixels R and G (e.g., the green subpixel G in this example) starts to increase its grayscale level as shown in FIG. 20(e).

Thereafter, when the red, green, and cyan subpixels R, G, and C reach the highest grayscale level, the sum of respective luminances of those subpixels other than the blue subpixel becomes 100% to make the color displayed by the pixel white. At this point in time, every subpixel is lit at the highest grayscale level as shown in FIG. 20(f).

Even when the lighting pattern of this example is adopted, the yellow subpixel Ye also starts to increase its grayscale level at an earlier timing than the red and green subpixels R and G start to increase theirs. That is why for the same reason as what has already been described for the lighting pattern of Example 12, deterioration in viewing angle characteristic that would otherwise be caused when the pixel displays a color close to the color blue can also be suppressed.

Furthermore, depending on the specifications of the liquid crystal display panel 10, the hue of the color yellow to be displayed when the yellow subpixel Ye is lit may be different from that of the color yellow to be displayed when the red, green and yellow subpixels R, G and Ye are lit at the same grayscale level. In that case, the hue of the color displayed by the pixel (i.e., a color close to the color blue) is suitably adjusted by starting to increase the grayscale levels of the red and green subpixels R and G at mutually different timings as is done in this example. By making such adjustment, the hue can be kept sufficiently identical while the color displayed by the pixel changes from the color blue into the color white.

For example, if the color yellow to be displayed when the yellow subpixel Ye is lit looks more greenish than the color yellow to be displayed when the red, green and yellow subpixels R, G and Ye are lit at the same grayscale level, the red subpixel R suitably starts to increase its grayscale level at an earlier timing than the green subpixel G starts to increase its own as shown in FIG. 20.

Conversely, if the color yellow to be displayed when the yellow subpixel Ye is lit looks more reddish than the color yellow to be displayed when the red, green and yellow subpixels R, G and Ye are lit at the same grayscale level, the green subpixel G suitably starts to increase its grayscale level at an earlier timing than the red subpixel R starts to increase its own.

Example 14

Figure 21:
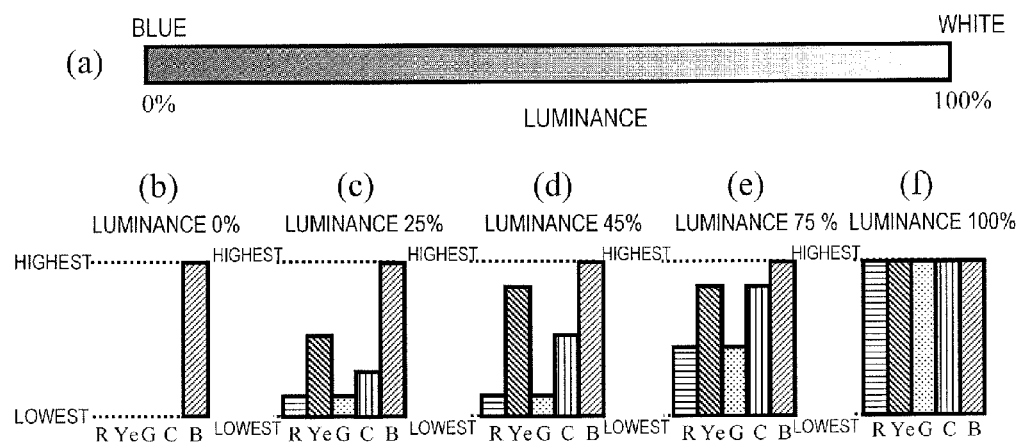
FIG. 21 Shows a lighting pattern according to Example 14, wherein (a) shows how the color displayed by a pixel changes with the sum of respective luminances of the subpixels other than a blue subpixel, and (b) through (f) show the grayscale levels of red, green, blue, yellow and cyan subpixels R, G, B, Ye and C when the sums of respective luminances of those subpixels other than the blue subpixel are 0%, 25%, 45%, 75% and 100%, respectively.

FIG. 21 shows a lighting pattern according to this example. FIG. 21(*a*) shows how the color displayed by a pixel changes with the sum of respective luminances of the subpixels other than the blue subpixel. On the other hand, FIGS. 21(*b*) through 21(*f*) show the grayscale levels of the red, green, blue, yellow and cyan subpixels R, G, B, Ye and C when the sums of respective luminances of those subpixels other than the blue subpixel are 0%, 25%, 45%, 75% and 100%, respectively.

In this example, the yellow and cyan subpixels Ye and C start to increase their grayscale levels at the same timing as the red and green subpixels R and G start to increase theirs. However, as the pixel increases its luminance, the yellow subpixel Ye, the cyan subpixel C, and the red and green subpixels R and G increase their grayscale level at mutually different ratios.

First of all, when the sum of respective luminances of all of those subpixels but the blue subpixel is 0%, the blue subpixel B is at the highest grayscale level, while the other subpixels are at the lowest grayscale level as shown in FIG. 21(*b*). That is to say, in this situation, only the blue subpixel B is lit at the highest grayscale level, while the red, green, yellow and cyan subpixels R, G, Ye and C are not lit.

Next, when the pixel starts to increase its luminance, the red, green, yellow and cyan subpixels R, G, Ye and C also start to increase their grayscale levels as shown in FIG. 21(*c*). However, the red and green subpixels R and G once stop increasing their grayscale levels after having started increasing them as shown in FIG. 21(*d*). That is why as the pixel increases its luminance, the yellow subpixel Ye increases its grayscale level at a different ratio from the red and green subpixels R and G. Also, the cyan and yellow subpixels C and Ye increase their grayscale levels at mutually different ratios as the pixel increases its luminance. Specifically, the cyan subpixel C increases its grayscale level at a smaller ratio than the yellow subpixel Ye does.

Subsequently, in this example, before the yellow subpixel Ye reaches the highest grayscale level (and naturally before the cyan subpixel C reaches the highest grayscale level), the red and green subpixels R and G start to increase their grayscale levels as shown in FIG. 21(*e*).

Thereafter, when the red, green, yellow and cyan subpixels R, G, Ye and C reach the highest grayscale level, the sum of respective luminances of those subpixels other than the blue subpixel becomes 100% to make the color displayed by the pixel white. At this point in time, every subpixel is lit at the highest grayscale level as shown in FIG. 21(*f*).

If the lighting pattern of this example is adopted, the yellow, red and green subpixels Ye, R and G start to increase their grayscale levels at the same time, but the red and green subpixels R and G once stop increasing their grayscale levels after that. That is why in the lighting state shown in FIG. 21(*c*), the signal grayscale of the yellow subpixel Ye is higher than in the lighting state shown in FIG. 15(*c*) because the red and green subpixels R and G have stopped increasing their grayscale levels. As a result, the luminance of the yellow subpixel Ye (i.e., panel grayscale) increases less when the panel is viewed obliquely, and therefore, the color close to the color blue which is being displayed by the pixel looks whitish much less often even when viewed obliquely. As can be seen, even if the lighting pattern of this example is adopted, the deterioration in viewing angle characteristic when the pixel displays such a color close to the color blue can also be suppressed.

In addition, if the yellow subpixel Ye is lit vaguely when the red and green subpixels R and G are lit and if the yellow subpixel Ye starts to increase its grayscale level again before the red and green subpixels R and G reach the highest grayscale level as is done in this example, the luminance can be easily kept continuous when the panel is viewed obliquely.

As described above, no matter which of the lighting patterns of Examples 1 through 14 is adopted, deterioration in viewing angle characteristic that would otherwise be caused when a pixel displays a color close to the color blue can always be suppressed. It should be noted that the lighting patterns that have been described for those Examples 1 to 14 are not related exclusively to the timings to light subpixels (i.e., timings to start increasing their grayscale levels) or the magnitudes of varying grayscale level increase ratios while the color displayed by a pixel is actually changed from the color blue into the color white. Rather, each of the lighting patterns described above is nothing but an algorithm for setting an appropriate combination of subpixels' grayscale levels (or display luminances) corresponding to a certain color displayed by a pixel (i.e., a color which falls within the range of the color blue through the color white shown in FIG. 6(*a*), for example).

In other words, in the liquid crystal display device 100 of this embodiment, as for a color which falls within the range of the color blue to the color white as shown in FIG. 6(*a*), for example, and in which the sum of respective luminances of the subpixels other than the blue subpixel falls within the range of 0% to 50% to say the least, the combination of subpixels' grayscale levels to display that color is determined based on the algorithm described above.

As can be seen from the foregoing description, by preparing an appropriate set of subpixels' grayscale levels in advance based on the algorithm described above (or by generating such a set through an arithmetic operation), the liquid crystal display device 100 of this embodiment can improve the viewing angle characteristic when a pixel displays a color close to the color blue.

(Result of Verification by Simulations)

The present inventors verified the effects to be achieved by the present invention through simulations. The results are as follows.

Figure 22:
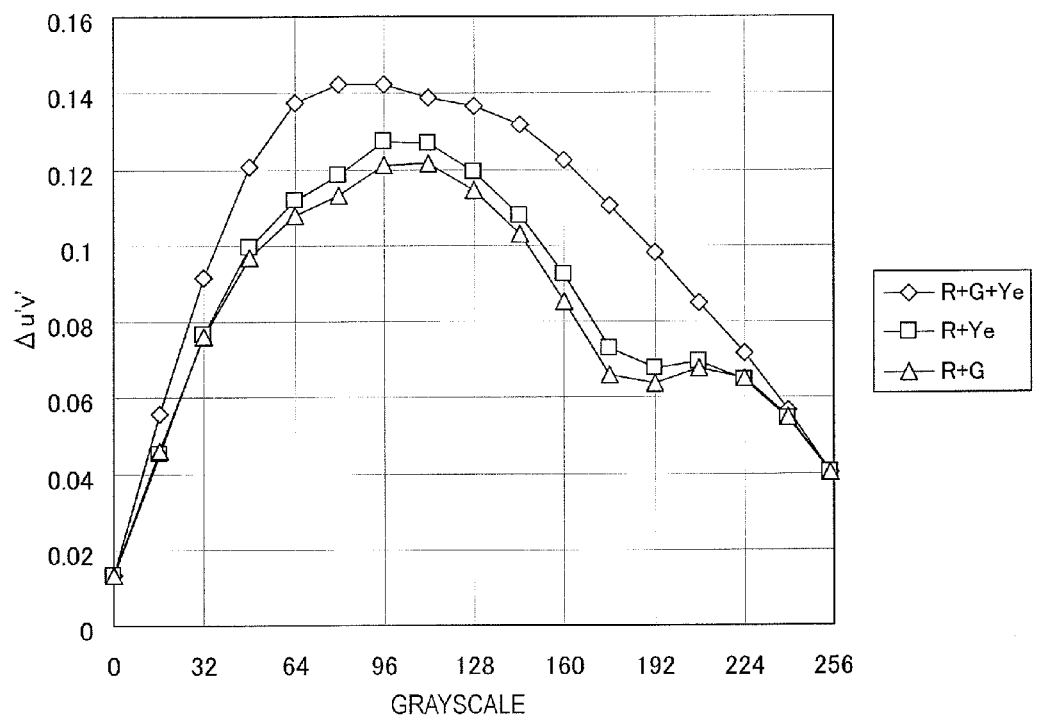
FIG. 22 A graph showing how a chromaticity difference Δu'v' of the color displayed by a pixel changed depending on whether the color was viewed straight on or obliquely from a 60 degree direction as the color of the pixel was changed from the color blue into the color white in a liquid crystal display device in which each pixel was defined by four subpixels, namely, red, green, blue, and yellow subpixels R, G, B and Ye, and which conducted a display operation in 256 grayscales.

FIG. 22 shows how a chromaticity difference $\Delta u'v'$ of the color displayed by a pixel changed depending on whether the color was viewed straight on or obliquely from a 60 degree direction as the color of the pixel was changed from the color blue into the color white in a liquid crystal display device in which each pixel was defined by four subpixels, namely, red, green, blue, and yellow subpixels R, G, B and Ye, and which conducted a display operation in 256 grayscales (i.e., of which the lowest grayscale level was zero and the highest grayscale level was 255).

In FIG. 22, the points plotted as "R+G+Ye" indicate how the chromaticity difference Δu'v' changes if the grayscale levels of red, green and yellow subpixels R, G and Ye are increased evenly from a state where the blue subpixel B has a grayscale level 255 (i.e., the highest grayscale level) and the other subpixels (i.e., red, green and yellow subpixels R, G and Ye) have a grayscale level 0 (i.e., the lowest grayscale level). For example, a point corresponding to the abscissa "Grayscale 64" indicates the chromaticity difference Δu'v' when the red, green, blue, and yellow subpixels R, G, B and Ye have grayscale levels (64, 64, 255, 64).

Also, the points plotted as "R+Ye" indicate how the chromaticity difference Δu'v' changes if the grayscale levels of red and yellow subpixels R and Ye are increased to make the chromaticity in the front direction agree with what is indicated by the points plotted as "R+G+Ye" from a state where the blue subpixel B has a grayscale level 255 and the other subpixels have a grayscale level 0. For example, a point corresponding to the abscissa "Grayscale 64" indicates the chromaticity difference Δu'v' in a situation where the grayscale levels of red and yellow subpixels R and Ye are increased so that the chromaticity in the front direction agrees with the value when the red, green, blue, and yellow subpixels R, G, B and Ye have grayscale levels (64, 64, 255, 64). In this case, the red, green, blue, and yellow subpixels R, G, B and Ye may have grayscale levels (40, 0, 255, 88), for example.

Furthermore, the points plotted as "R+G" indicate how the chromaticity difference Δu'v' changes if the grayscale levels of red and green subpixels R and G are increased to make the chromaticity in the front direction agree with what is indicated by the points plotted as "R+G+Ye" from a state where the blue subpixel B has a grayscale level 255 and the other subpixels have a grayscale level 0. For example, a point corresponding to the abscissa "Grayscale 64" indicates the chromaticity difference Δu'v' in a situation where the grayscale levels of red and green subpixels R and G are increased so that the chromaticity in the front direction agrees with the value when the red, green, blue, and yellow subpixels R, G, B and Ye have grayscale levels (64, 64, 255, 64). In this case, the red, green, blue, and yellow subpixels R, G, B and Ye may have grayscale levels (80, 88, 255, 0), for example.

As shown in FIG. 22, the chromaticity differences Δu'v' indicated by "R+Ye" and "R+G" are smaller than what is indicated by "R+G+Ye". These results reveal that while the color displayed by a pixel is changed from the color blue into the color white, the smaller chromaticity differences Δu'v' can be obtained (i.e., a better viewing angle characteristic can be achieved) by increasing the luminance of the pixel using the two subpixels (which are either the red and yellow subpixels R and Ye or the red and green subpixels R and G in this example) rather than using the three subpixels (i.e., the red, green and yellow subpixels R, G and Ye) evenly.

As can also be seen from FIG. 22, the viewing angle characteristic to be achieved with "R+G" is even superior to the characteristic to be achieved with "R+Ye". The reason is that in the example shown in FIG. 22, the sum of respective luminances of the red and green subpixels R and G which are at the highest grayscale level is lower than that luminance of the yellow subpixel Ye which is at the highest grayscale level. That is to say, if "R+G" with the lower luminance is lit earlier, the higher grayscale level will be used even at the same luminance, and therefore, the viewing angle characteristic at a half tone can be improved as described above.

Figure 23:
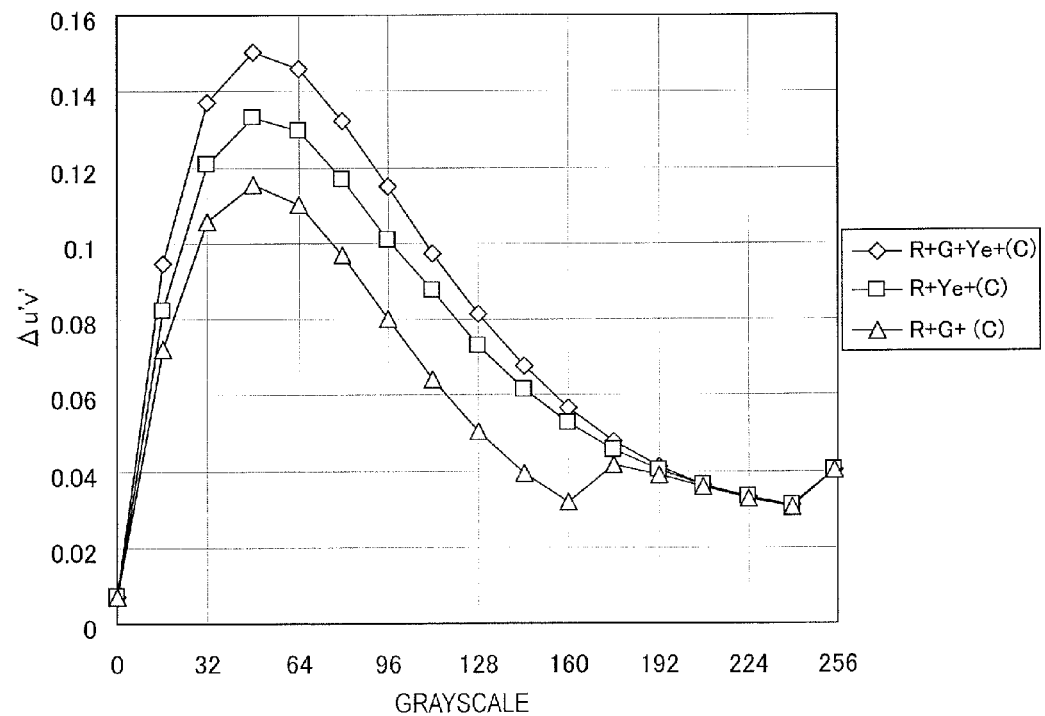
FIG. 23 A graph showing how a chromaticity difference Δu'v' of the color displayed by a pixel changed depending on whether the color was viewed straight on or obliquely from a 60 degree direction as the color of the pixel was changed from the color blue into the color white in a liquid crystal display device in which each pixel was defined by five subpixels, namely, red, green, blue, yellow and cyan subpixels R, G, B, Ye and C, and which conducted a display operation in 256 grayscales.

FIG. 23 shows how a chromaticity difference Δu'v' of the color displayed by a pixel changed depending on whether the color was viewed straight on or obliquely from a 60 degree direction as the color of the pixel was changed from the color blue into the color white in a liquid crystal display device in which each pixel was defined by five subpixels, namely, red, green, blue, yellow and cyan subpixels R, G, B, Ye and C, and which conducted a display operation in 256 grayscales (i.e., of which the lowest grayscale level was zero and the highest grayscale level was 255).

In FIG. 23, the points plotted as "R+G+Ye+(C)" indicate how the chromaticity difference Δu'v' changes if the grayscale levels of red, green, yellow and cyan subpixels R, G, Ye and C are increased evenly from a state where the blue subpixel B has a grayscale level 255 (i.e., the highest grayscale level) and the other subpixels (i.e., red, green, yellow and cyan subpixels R, G, Ye and C) have a grayscale level 0 (i.e., the lowest grayscale level). For example, a point corresponding to the abscissa "Grayscale 64" indicates the chromaticity difference Δu'v' when the red, green, blue, yellow and cyan subpixels R, G, B, Ye and C have grayscale levels (64, 64, 255, 64, 64).

Also, the points plotted as "R+Ye+(C)" indicate how the chromaticity difference Δu'v' changes if the grayscale level of the cyan subpixel C is increased at a constant rate (e.g., at the same rate as "R+G+Ye+(C)") and if the grayscale levels of red and yellow subpixels R and Ye are increased appropriately to make the chromaticity in the front direction agree with what is indicated by the points plotted as "R+G+Ye+(C)" from a state where the blue subpixel B has a grayscale level 255 and the other subpixels have a grayscale level 0. For example, a point corresponding to the abscissa "Grayscale 64" indicates the chromaticity difference Δu'v' in a situation where the grayscale levels of red and yellow subpixels R and Ye are adjusted so that the chromaticity in the front direction agrees with the value when the red, green, blue, yellow and cyan subpixels R, G, B, Ye and C have grayscale levels (64, 255, 64, 64). In this case, the red, green, blue, yellow and cyan subpixels R, G, B, Ye and C may have grayscale levels (47, 0, 255, 80, 64), for example.

Furthermore, the points plotted as "R+G+(C)" indicate how the chromaticity difference Δu'v' changes if the grayscale level of the cyan subpixel C is increased at a constant rate (e.g., at the same rate as "R+G+Ye+(C)") and if the grayscale levels of red and green subpixels R and G are increased appropriately to make the chromaticity in the front direction agree with what is indicated by the points plotted as "R+G+Ye+(C)" from a state where the blue subpixel B has a grayscale level 255 and the other subpixels have a grayscale level 0. For example, a point corresponding to the abscissa "Grayscale 64" indicates the chromaticity difference Δu'v' in a situation where the grayscale levels of red and green subpixels R and G are adjusted so that the chromaticity in the front direction agrees with the value when the red, green, blue, yellow and cyan subpixels R, G, B, Ye and C have grayscale levels (64, 64, 255, 64, 64). In this case, the red, green, blue, yellow and cyan subpixels R, G, B, Ye and C may have grayscale levels (83, 99, 255, 0, 64), for example.

As can be seen from FIG. 23, the chromaticity differences Δu'v' indicated by "R+Ye+(C)" and "R+G+(C)" are smaller than what is indicated by "R+G+Ye+(C)". These results reveal that while the color displayed by a pixel is changed from the color blue into the color white, the smaller chromaticity differences Δu'v' can be obtained (i.e., a better viewing angle characteristic can be achieved) by increasing the luminance of the pixel using two subpixels (which are either the red and yellow subpixels R and Ye or the red and green subpixels R and G in this example) out of the three subpixels other than the blue and cyan subpixels B and C rather than using all of those three subpixels (i.e., the red, green and yellow subpixels R, G and Ye) other than the blue and cyan subpixels B and C evenly.

(Specific Configuration for Signal Converter)

Next, an exemplary more specific configuration for the signal converter 20 will be described.

The signal converter 20 has a lookup table which stores data about a subpixel luminance representing the color to be specified by a three-primary-color image signal. Thus, by referring to that lookup table with the three-primary-color image signal input, the signal converter 20 can generate a multi-primary-color image signal. However, if the lookup table stored such data about a subpixel luminance for every color, the data size of the lookup table would be too big to make such a lookup table using an inexpensive memory with a small capacity.

Figure 24:
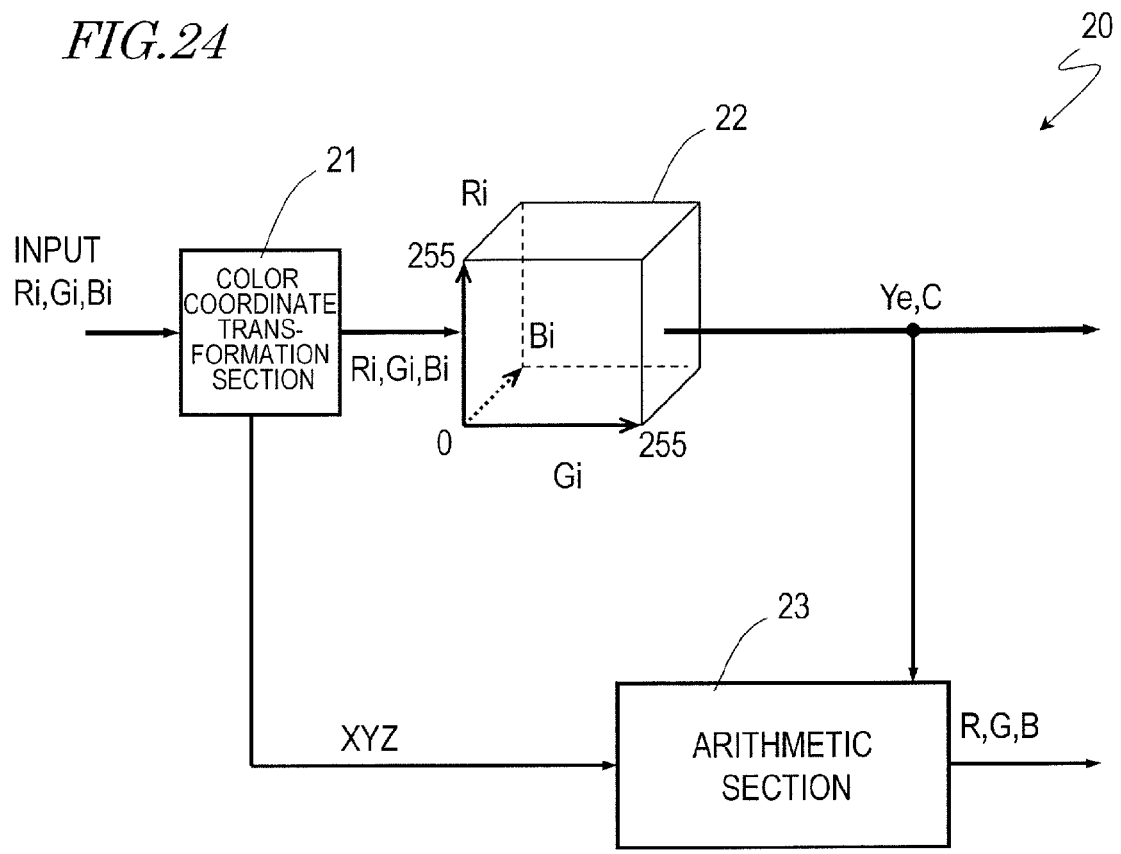
FIG. 24 A block diagram illustrating an exemplary preferred configuration for a signal converter 20 that the liquid crystal display device 100 has.

FIG. 24 illustrates an exemplary preferred configuration for the signal converter 20. The signal converter 20 shown in FIG. 24 includes a color coordinate transformation section 21, a lookup table memory 22, and an arithmetic section 23.

The color coordinate transformation section 21 receives a three-primary-color image signal representing the respective luminances of the three primary colors, and transforms color coordinates in the RGB color space into color coordinates in the XYZ color space. Specifically, the color coordinate transformation section 21 carries out a matrix transformation on an RGB signal (including Ri, Gi and Bi components representing the respective luminances of the colors red, green and blue) as represented by the following Equation (1), thereby obtaining XYZ values. The three by three matrix shown as an example in Equation (1) was defined compliant with the BT. 709 standard.

$$\begin{pmatrix} X \\ Y \\ Z \end{pmatrix} = \begin{pmatrix} 0.4124 & 0.3576 & 0.1804 \\ 0.2127 & 0.7152 & 0.0722 \\ 0.0193 & 0.1192 & 0.9502 \end{pmatrix} \begin{pmatrix} Ri \\ Gi \\ Bi \end{pmatrix} \quad (1)$$

The lookup table memory 22 stores a lookup table, which includes data about the yellow and cyan subpixels' luminances corresponding to the three primary colors' luminances Ri, Gi and Bi represented by the three-primary-color image signal. In this case, the luminances Ri, Gi and Bi are obtained by subjecting grayscale values represented in 256 grayscales to inverse γ correction, and the number of colors to be specified by the three-primary-color image signal is 256×256×256. On the other hand, the lookup table stored in the lookup table memory 22 includes 256×256×256 data with a three-dimensional matrix structure corresponding to the number of colors that can be specified by the three-primary-color image signal. By consulting the lookup table stored in the lookup table memory 22, yellow and cyan subpixels' luminances Ye and C corresponding to the luminances Ri, Gi and Bi can be obtained.

The arithmetic section 23 performs an arithmetic operation using the XYZ values obtained by the color coordinate transformation section 21 and the yellow and cyan subpixels' luminances Ye and C obtained by the lookup table memory 22, thereby calculating the red, green and blue subpixels' luminances R, G and B. Specifically, the arithmetic section 23 performs the arithmetic operation by the following Equation (2):

$$\begin{pmatrix} R \\ G \\ B \end{pmatrix} = \begin{pmatrix} X_R & X_G & X_B \\ Y_R & Y_G & Y_B \\ Z_R & Z_G & Z_B \end{pmatrix}^{-1} \begin{pmatrix} X - (X_{Ye} \times Ye + X_C \times C) \\ Y - (Y_{Ye} \times Ye + Y_C \times C) \\ Z - (Z_{Ye} \times Ye + Z_C \times C) \end{pmatrix} \quad (2)$$

Hereinafter, it will be described with reference to the following Equations (3) and (4) why the red, green and blue subpixels' luminances R, G and B can be calculated by performing the arithmetic operation represented by Equation (2):

$$\begin{pmatrix} X \\ Y \\ Z \end{pmatrix} = \begin{pmatrix} X_R & X_G & X_B & X_{Ye} & X_C \\ Y_R & Y_G & Y_B & Y_{Ye} & Y_C \\ Z_R & Z_G & Z_B & Z_{Ye} & Z_C \end{pmatrix} \begin{pmatrix} R \\ G \\ B \\ Ye \\ C \end{pmatrix} \quad (3)$$

$$\begin{pmatrix} X \\ Y \\ Z \end{pmatrix} = \begin{pmatrix} X_R & X_G & X_B \\ Y_R & Y_G & Y_B \\ Z_R & Z_G & Z_B \end{pmatrix} \begin{pmatrix} R \\ G \\ B \end{pmatrix} + \begin{pmatrix} X_{Ye} & X_C \\ Y_{Ye} & Y_C \\ Z_{Ye} & Z_C \end{pmatrix} \begin{pmatrix} Ye \\ C \end{pmatrix} \quad (4)$$

Supposing the color specified by the three-primary-color image signal to be input to the signal converter 20 is the same as the color specified by the multi-primary-color image signal to be output from the signal converter 20, the XYZ values to be obtained by transforming the three primary colors' luminances Ri, Gi and Bi can also be represented by the matrix transformation equation (3) for the red, green, blue, yellow, and cyan subpixels R, G, B, Ye and C. The coefficients $X_R, Y_R, Z_R, \ldots$ and $Z_c$ of the three by five transformation matrix included in Equation (3) are determined based on the XYZ values of the respective subpixels in the liquid crystal display panel 10.

As shown in Equation (4), the right side of Equation (3) can be modified into the sum of (R, G, B) multiplied by a three by three transformation matrix and (Ye, C) multiplied by a three by two transformation matrix. Since Equation (2) can be obtained by further modifying this Equation (4), the red, green and blue subpixels' luminances R, G and B can be calculated by performing the arithmetic operation in accordance with Equation (2).

In this manner, the arithmetic section 23 can obtain the red, green and blue subpixels' luminances R, G and B based on the XYZ values obtained by the color coordinate transformation section 21 and on the yellow and cyan subpixels' luminances Ye and C obtained by the lookup table memory 22.

As described above, the signal converter 20 shown in FIG. 24 obtains two subpixels' luminances first by reference to the lookup table that is stored in the lookup table memory 22, and then gets the three other subpixels' luminances calculated by the arithmetic section 23. That is why the lookup table stored in the lookup table memory 22 does not have to include data about all five subpixels' luminances but just needs to include data about the luminances of only two out of the five subpixels. Consequently, by adopting the configuration shown in FIG. 24, a lookup table can be made easily using an inexpensive memory with a small capacity.

In the example described above, data about yellow and cyan subpixels' luminances is supposed to be stored in the lookup table and the luminances of the other red, green and blue subpixels are supposed to be calculated by the arithmetic section 23. However, this is only an example of the present invention. Rather, as long as the lookup table stores data about any two subpixels' luminances, the arithmetic section 23 can calculate the other three subpixels' luminances.

Also, even if the number of subpixels that define a single pixel is not five as in the example described above, the size of data to be stored in the lookup table can also be cut down by the same technique. That is to say, supposing the number of primary colors to be used to conduct a display operation is n, the signal converter 20 may obtain the luminances of (n−3) out of the n primary colors (i.e., data about those (n−3) primary colors' luminances needs to be stored in the lookup table) and perform an arithmetic operation on those (n−3) primary colors' luminances, thereby calculating the luminances of the other three out of the n primary colors.

For example, if a single pixel is defined by four subpixels (such as red, green, blue and yellow subpixels), the signal converter 20 may obtain a single subpixel's luminance by reference to the lookup table and then get the other three subpixels' luminances calculated by the arithmetic section 23.

The respective components of the signal converter 20 could be implemented as hardware elements but could also be implemented by software programs either partially or even entirely. If those elements are implemented by software, a computer may be used as needed. In that case, the computer may include a CPU (central processing unit) for executing those various programs and a RAM (random access memory) functioning as a work area to execute those programs. And by getting those programs that perform the functions of the respective elements executed by the computer, those elements are implemented by the computer itself, so to speak.

Also, those programs may be either installed into the computer by way of a storage medium or downloaded into the computer over a telecommunications network. In the former case, the storage medium may be either removable from the computer or built in the computer. More specifically, the storage medium could be loaded either into the computer so that the computer can read the recorded program code directly or into a program reader that is connected as an external storage device to the computer. Examples of preferred storage media include: tapes such as magnetic tapes and cassette tapes; various types of disks including magnetic disks such as flexible disks and hard disks, magneto-optical disks such as MOs and MDs, and optical discs such as CD-ROMs, DVDs, and CD-Rs; cards such as IC cards (including memory cards) and optical cards; and various types of semiconductor memories such as mask ROMs, EPROMs (erasable programmable read-only memories), EEPROMs (electrically erasable programmable read-only memories) and flash ROMs. Alternatively, if the program is downloaded over a telecommunications network, the program may be transmitted as a carrier wave or a data signal in which its program code is implemented as a type of electronic transmission.

(Specific Configuration for Liquid Crystal Display Panel)

Hereinafter, an exemplary specific configuration for the liquid crystal display panel 10 will be described.

Figure 25:
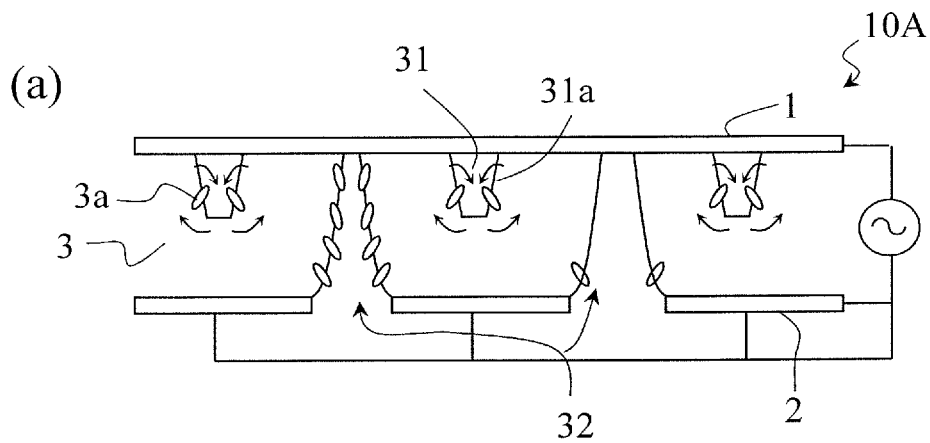
FIG. 25 (a) to (c) illustrate basic configurations for MVA mode liquid crystal display panels.
Figure 25:
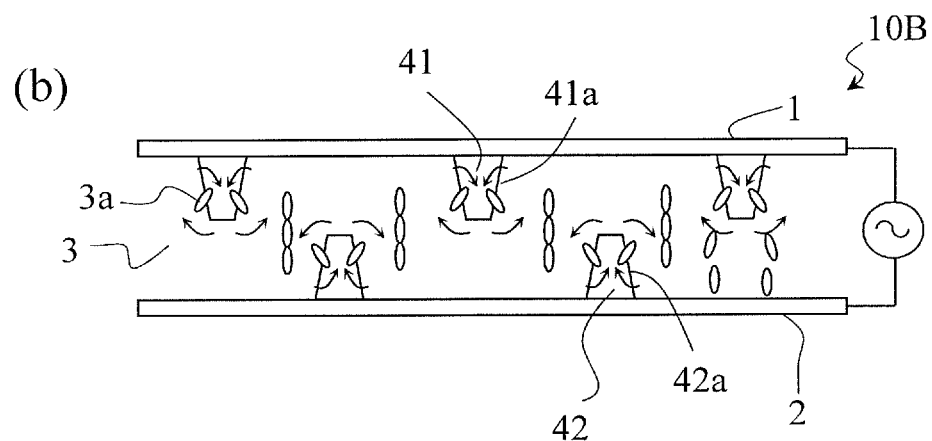
Figure 25:
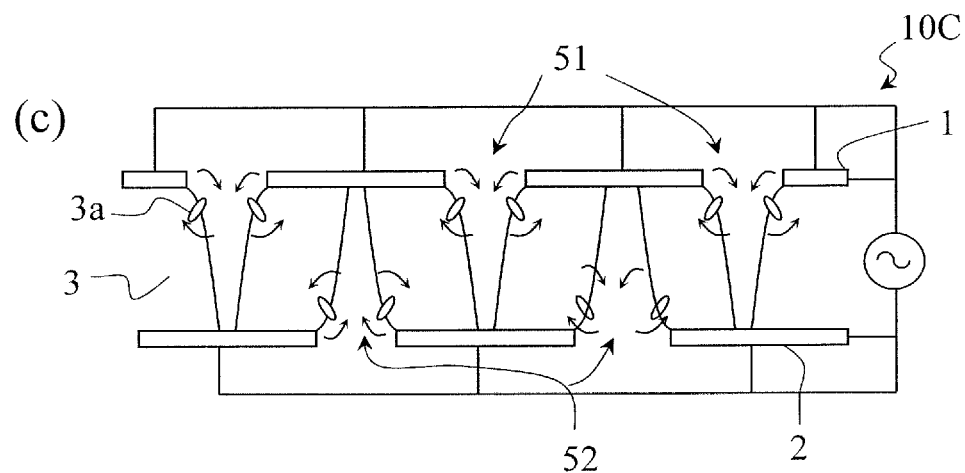

First of all, a basic configuration for an MVA mode liquid crystal display panel 10 will be described with reference to FIGS. 25(a) through 25(c).

Each subpixel of these liquid crystal display panel 10A, 10B and 10C includes a first electrode 1, a second electrode 2 which faces the first electrode 1, and a vertical alignment liquid crystal layer 3 which is interposed between the first and second electrodes 1 and 2. The vertical alignment liquid crystal layer 3 includes liquid crystal molecules 3a with negative dielectric anisotropy, and the liquid crystal molecules 3a are aligned substantially perpendicularly (e.g., to define an angle of 87 to 90 degrees) to the surface of the first and second electrodes 1 and 2 when no voltage is applied thereto. Typically, a vertical alignment film (not shown) is provided on the surface of each of the first and second electrodes 1 and 2 so as to front on the liquid crystal layer 3.

First alignment control means (31, 41, 51) is provided on the first electrode 1 to front on the liquid crystal layer 3, and second alignment control means (32, 42, 52) is provided on the second electrode 2 to front on the liquid crystal layer 3. In a liquid crystal region to be defined between the first and second alignment control means, the liquid crystal molecules 3a are subjected to the alignment controlling force supplied from the first and second alignment control means, and will fall (or tilt) in the direction indicated by the arrows in FIG. 25 when a voltage is applied to between the first and second electrodes 1 and 2. That is to say, since the liquid crystal molecules 3a fall in the same direction in each liquid crystal region, such a liquid crystal region can be regarded as a domain.

The first and second alignment control means (which will be sometimes collectively referred to herein as "alignment control means") are arranged in stripes in each subpixel. FIGS. 25(a) to 25(c) are cross-sectional views as viewed on a plane that intersects at right angles with the direction in which those striped alignment control means run.

On two sides of each alignment control means, produced are two liquid crystal domains, in one of which liquid crystal molecules 3a fall in a particular direction and in the other of which liquid crystal molecules 3a fall in another direction that defines an angle of 180 degrees with respect to that particular direction. As the alignment control means, any of various alignment control means (domain control means) as disclosed in Japanese Laid-Open Patent Publication No. 11-242225 may be used, for example.

The liquid crystal display panel 10A shown in FIG. 25(a) includes ribs (i.e., projections) 31 as the first alignment control means and slits 32 (where there is no conductive film) which have been cut through the second electrode 2 as the second alignment control means. These ribs and slits 32 are extended so as to run in stripes (or strips). Each rib 31 induces alignments of the liquid crystal molecules 3a substantially perpendicularly to its side surface 31a, and eventually, perpendicularly to the direction in which the rib 31 runs. On the other hand, when a potential difference is created between the first and second electrodes 1 and 2, each slit 32 generates an oblique electric field in a region of the liquid crystal layer 3 around the edges of the slit 32 and induces alignments of the liquid crystal molecules 3a perpendicularly to the direction in which the slit 32 runs. Each rib 31 and its associated slit 32 are arranged parallel to each other with a certain gap left between them. That is to say, a liquid crystal domain is defined between one rib 31 and its associated rib 32 that are adjacent to each other.

Unlike the liquid crystal display panel 10A shown in FIG. 25(a), the liquid crystal display panel 10B shown in FIG. 25(b) includes a rib (first rib) 41 and a rib (second rib) 42 as the first and second alignment control means, respectively. The first and second ribs 41 and 42 are arranged parallel to each other with a certain gap left between them and induce alignments of the liquid crystal molecules 3a substantially perpendicularly to their side surfaces 41a and 42a, thereby producing liquid crystal domains between them.

Unlike the liquid crystal display panel 10A shown in FIG. 25(a), the liquid crystal display panel 10C shown in FIG. 25(c) includes a slit (first slit) 51 and a slit (second slit) 52 as the first and second alignment control means, respectively. When a potential difference is produced between the first and second electrodes 1 and 2, the first and second slits 51 and 52 generate an oblique electric field in a region of the liquid crystal layer 3 around their edges and induce alignments of the liquid crystal molecules 3a perpendicularly to the direction in which the first and second slits 51 and 52 run. These first and second slits 51 and 52 are also arranged parallel to each other with a certain gap left between them, thereby producing liquid crystal domains between them.

As described above, such ribs and slits may be used in any arbitrary combination as the first and second alignment control means. The first and second electrodes 1 and 2 may be any pair of electrodes as long as they face each other with the liquid crystal layer 3 interposed between them. Typically, one of the first and second electrodes 1 and 2 is a counter electrode and the other is a pixel electrode. In the following example, a more specific configuration for the liquid crystal display panel 10A including ribs 31 as the first alignment control means and slits 32 which have been cut through the pixel electrode as the second alignment control means will be described on the supposition that the first electrode 1 is a counter electrode and the second electrode 2 is a pixel electrode. If the configuration of the liquid crystal display panel 10A shown in FIG. 25(a) is adopted, the increase in the number of manufacturing processing steps required can be minimized, which is beneficial. Specifically, even though slits need to be cut through the pixel electrodes, no additional process steps need to be done. As for the counter electrode, on the other hand, the number of manufacturing processing steps increases less with the ribs provided for it than with the slits cut through it. However, it is naturally possible to adopt a configuration in which only ribs are used as the alignment control means or a configuration in which just slits are used as the alignment control means.

Figure 26:
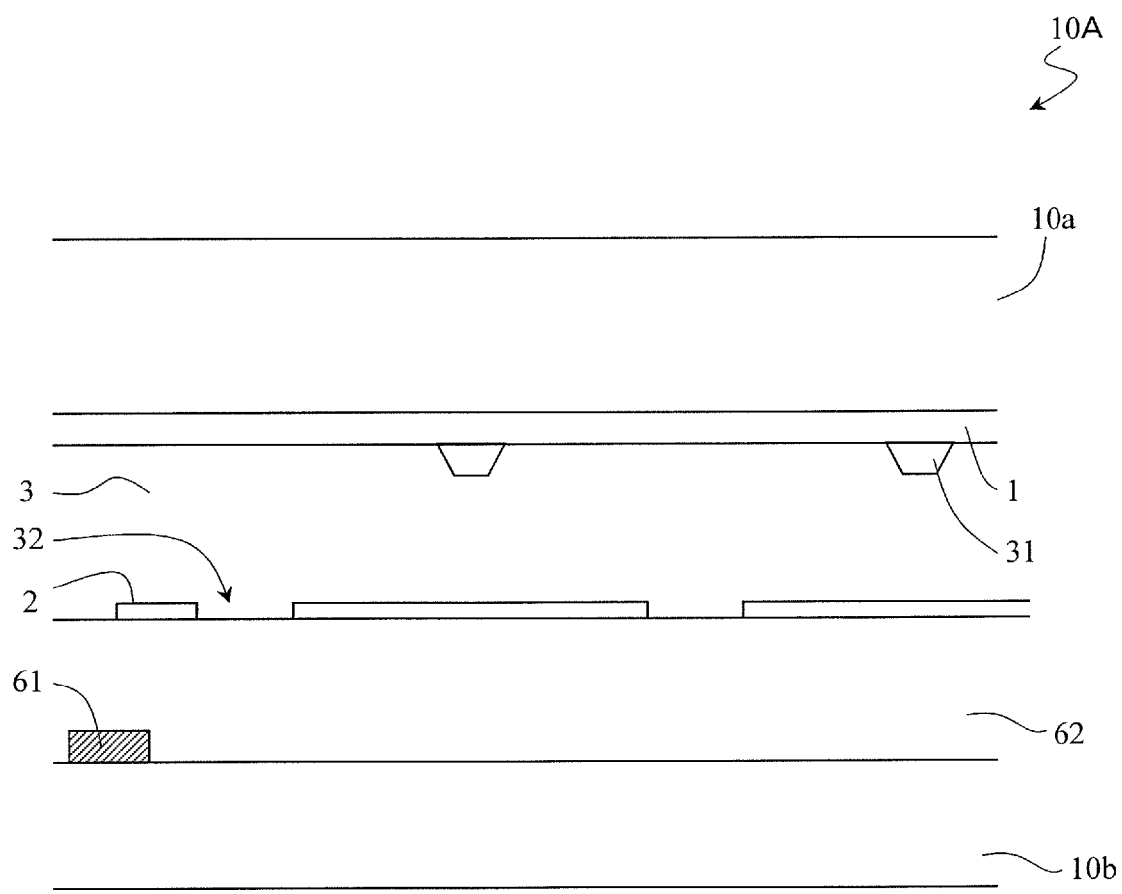
FIG. 26 A partial cross-sectional view schematically illustrating a cross-sectional structure for the MVA mode liquid crystal display panel 10A.
Figure 27:
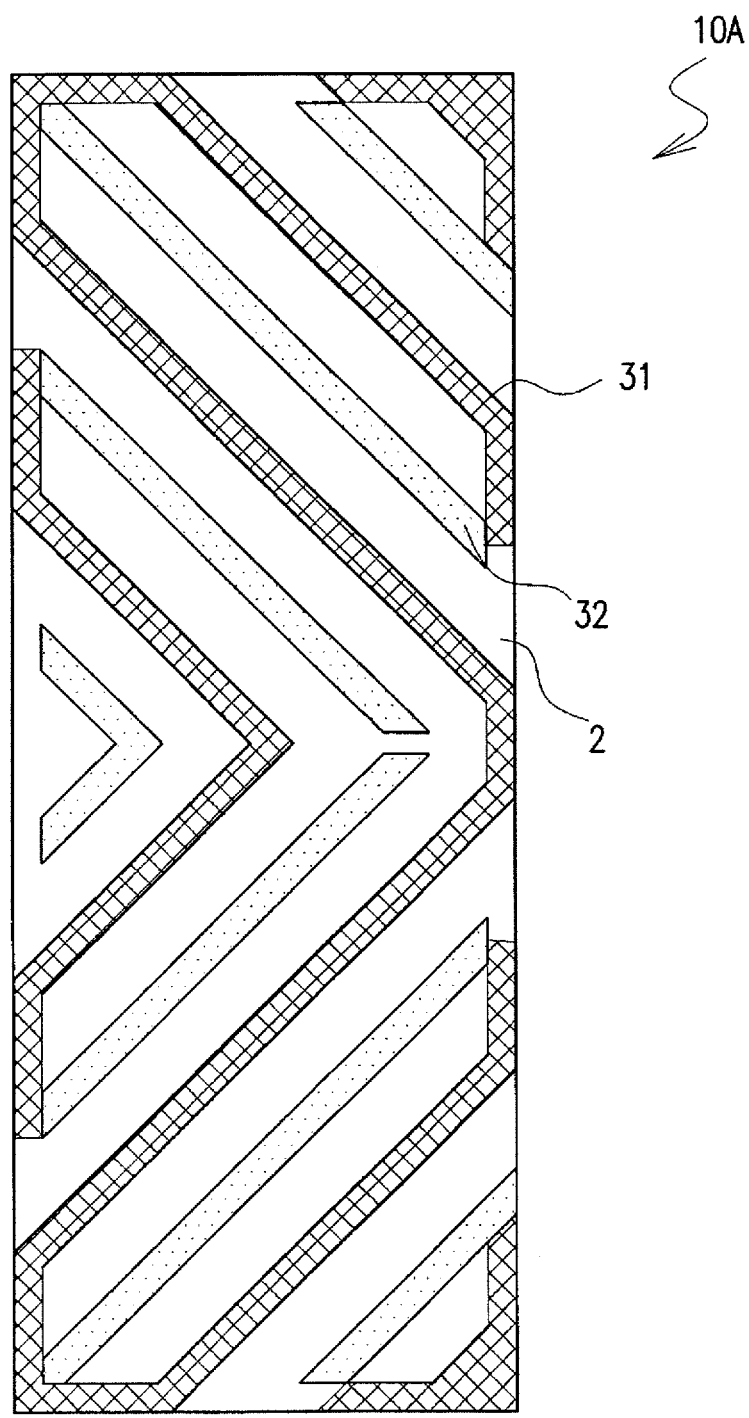
FIG. 27 A plan view schematically illustrating a region allocated to a single subpixel in the MVA mode liquid crystal display panel 10A.

FIG. 26 is a partial cross-sectional view schematically illustrating a cross-sectional structure for the liquid crystal display panel 10A. FIG. 27 is a plan view schematically illustrating a region allocated to one subpixel in the liquid crystal display panel 10A.

The liquid crystal display panel 10A includes a first substrate (e.g., a glass substrate) 10a, a second substrate (e.g., a glass substrate) 10b which faces the first substrate 10a, and a vertical alignment liquid crystal layer 3 interposed between the first and second substrates 10a and 10b. A counter electrode 1 is arranged on the surface of the first substrate 10a to front on the liquid crystal layer 3, and ribs 31 have been formed on the counter electrode 1. And a vertical alignment film (not shown) is further provided so as to cover the surface of the counter electrode 1 that fronts on the liquid crystal layer 3 and the ribs 31. As shown in FIG. 27, the ribs 31 are arranged in stripes and each pair of adjacent ribs 31 are arranged parallel to each other.

On the surface of the second substrate (e.g., glass substrate) 10b that fronts on the liquid crystal layer 3, arranged are gate bus lines (scan lines (not shown)), source bus lines (signal lines) 61, and TFTs (not shown), and an interlayer insulating film 62 is provided to cover all of these lines and TFTs. And pixel electrodes 2 have been formed on the interlayer insulating film 62. The pixel electrodes 2 and the counter electrode 1 face each other with the liquid crystal layer 3 interposed between them.

Striped slits 32 have been cut through the pixel electrodes 2. And the surface of the pixel electrodes 2 that fronts on the liquid crystal layer 3 is covered with a vertical alignment film (not shown). As shown in FIG. 27, those slits 32 run in stripes. Two adjacent slits 32 are arranged parallel to each other so that each slit 32 splits the gap between its adjacent ribs 31 into two substantially evenly.

In the region between a striped rib 31 and its associated slit 32 which are arranged parallel to each other, the alignment direction is controlled by the rib 31 and slit 32 that interpose that region. As a result, two domains are produced on both sides of the rib 31 and on both sides of the slit 32 so that the tilt direction of the liquid crystal molecules 3a in one of those two domains is different from that of the liquid crystal molecules 3a in the other domain by 180 degrees. In this liquid crystal display panel 10A, the ribs 31 are arranged to run in two different directions that define an angle of 90 degrees between them, so are the slits 32 as shown in FIG. 27. Consequently, four liquid crystal domains, in any of which the alignment direction of the liquid crystal molecules 3a is different by 90 degrees from their counterparts' in each of its adjacent domains, are produced in each subpixel.

Also, two polarizers (not shown) are arranged on the outside of the first and second substrates 10a and 10b as crossed Nicols so that their transmission axes cross each other substantially at right angles. If the polarizers are arranged so that the alignment direction in each of the four domains, which is different by 90 degrees from the one in any adjacent domain, and the transmission axis of its associated one of the polarizers define an angle of 45 degrees between them, the variation in retardation due to the creation of those domains can be used most efficiently. For that reason, the polarizers are suitably arranged so that their transmission axes define an angle of approximately 45 degrees with respect to the directions in which the slits 31 and the ribs 32 run. Also, in a display device such as a TV monitor to which the viewer often changes his or her viewing direction horizontally, the transmission axis of one of the two polarizers is suitably arranged horizontally with respect to the display screen in order to reduce the viewing angle dependence of the display quality.

In the liquid crystal display panel 10A with such a configuration, when a predetermined voltage is applied to the liquid crystal layer 3, a number of regions (i.e., domains) where the liquid crystal molecules 3a tilt in mutually different directions are produced in each subpixel, thus realizing a display with a wide viewing angle.

Hereinafter, an exemplary configuration for a CPA mode liquid crystal display panel 10 will be described with reference to FIG. 28.

Figure 28:
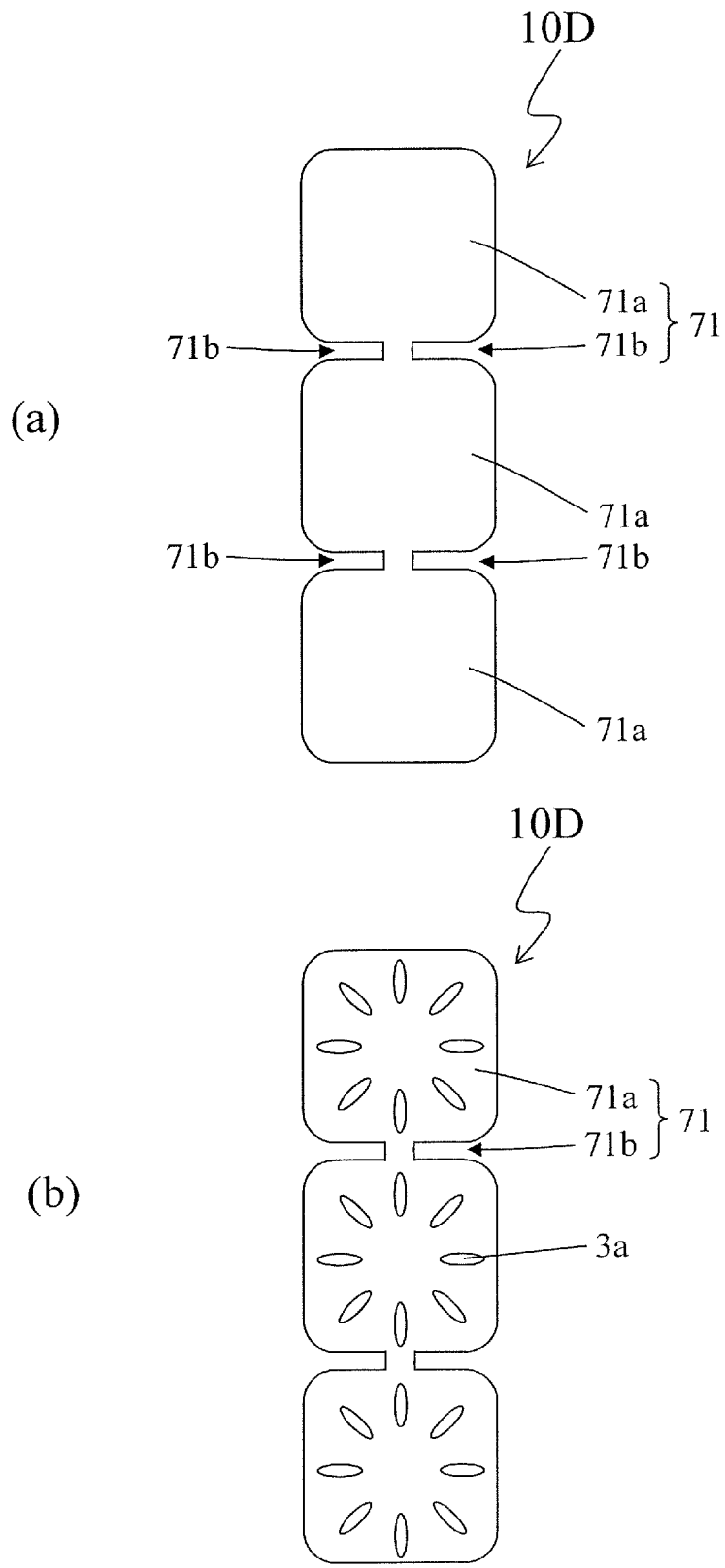
FIGS. 28 (a) and (b) are plan views schematically illustrating a region allocated to a single subpixel in a CPA mode liquid crystal display panel 10D.

Each pixel electrode 71 of the liquid crystal display panel 10D shown in FIG. 28(a) has multiple notches 71b at predetermined positions, which further divide the pixel electrode 71 into a number of subpixel electrodes 71a. Each of these subpixel electrodes 71a has a substantially rectangular shape. In the example shown in FIG. 28, each pixel electrode 71a is supposed to be subdivided into three subpixel electrodes 71a. However, the number of divisions does not have to be three.

When a voltage is applied to between the pixel electrode 71 with such a configuration and the counter electrode (not shown), an oblique electric field is generated around the outer periphery of the pixel electrode 71 and inside its notches 71b, thereby producing a number of liquid crystal domains in which liquid crystal molecules are aligned axisymmetrically (i.e., have radially tilted orientations) as shown in FIG. 28(b). One liquid crystal domain is produced on each subpixel electrode 71a. And in each liquid crystal domain, the liquid crystal molecules 3a tilt in almost every direction. That is to say, in this liquid crystal display panel 10D, there are an infinite number of regions where the liquid crystal molecules 3a tilt in mutually different directions. As a result, a wide viewing angle display is realized.

Figure 29:
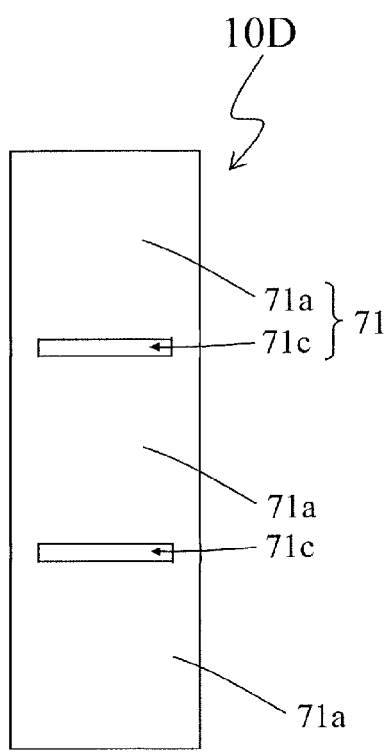
FIG. 29 A plan view schematically illustrating a region allocated to a single subpixel in another CPA mode liquid crystal display panel 10D.
Figure 30:
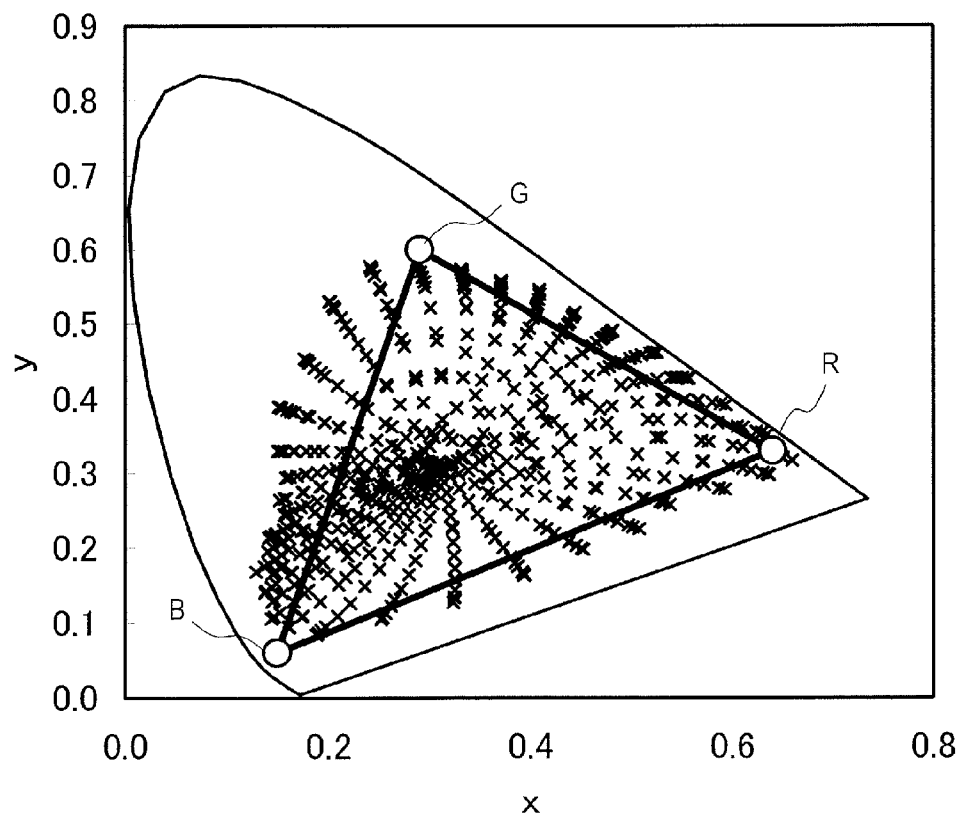
FIG. 30 An xy chromaticity diagram showing a color reproduction range of a three-primary-color display device.
Figure 31:
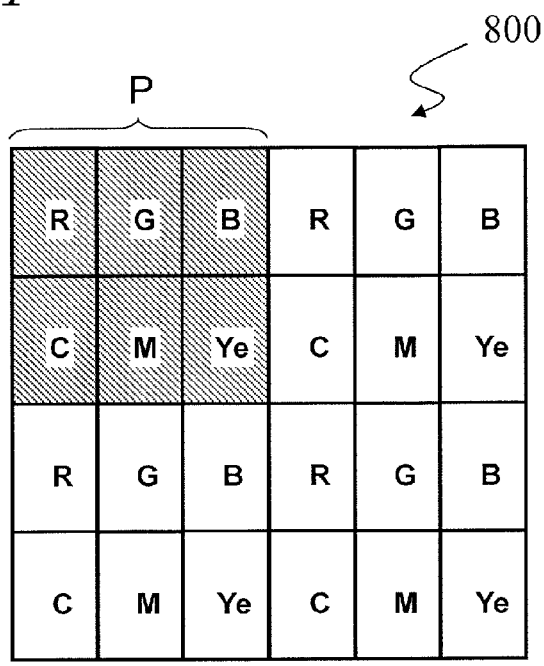
FIG. 31 Schematically illustrates a conventional multi-primary-color liquid crystal display device 800.
Figure 32:
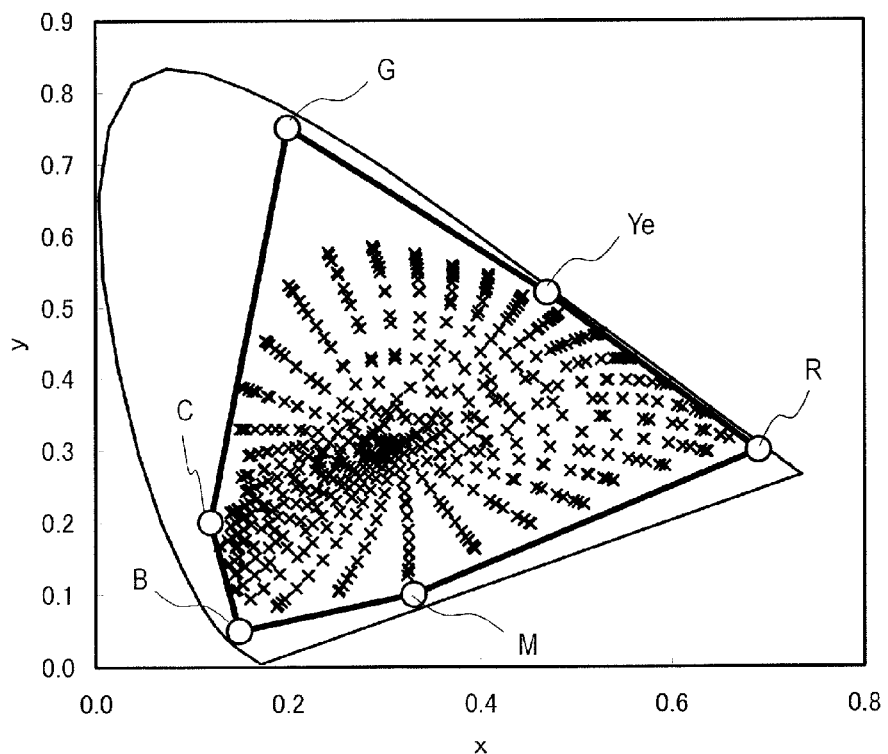
FIG. 32 An xy chromaticity diagram showing a color reproduction range of the multi-primary-color liquid crystal display device 800.

The pixel electrode 71 shown in FIG. 28 has notches 71b. However, the notches 71b may be replaced with windows 71c as shown in FIG. 29. Each pixel electrode 71 shown in FIG. 29 has multiple windows 71c, which subdivide the pixel electrode 71 into a number of subpixel electrodes 71a. When a voltage is applied to between such a pixel electrode 71 and the counter electrode (not shown), an oblique electric field is generated around the outer periphery of the pixel electrode 71 and inside its windows 71c, thereby producing a number of liquid crystal domains in which liquid crystal molecules are aligned axisymmetrically (i.e., have radially tilted orientations).

In the examples illustrated in FIGS. 28 and 29, each single pixel electrode 71 has either multiple notches 71b or multiple windows 71c. However, if each pixel electrode 71 needs to be split into two, only one notch 71b or window 71c may be provided. In other words, by providing at least one notch 71b or window 71c for each pixel electrode 71, multiple axisymmetrically aligned liquid crystal domains can be produced. The pixel electrode 71 may have any of various shapes as disclosed in Japanese Laid-Open Patent Publication No. 2003-43525, for example.

INDUSTRIAL APPLICABILITY

According to embodiments of the present invention, a liquid crystal display device which conducts a display operation in colors using four or more primary colors can suppress deterioration in viewing angle characteristic that would otherwise be caused when a pixel displays a color close to the color blue. A liquid crystal display device according to the present invention can conduct a display operation of high quality, and therefore, can be used effectively in a liquid crystal TV set and various other electronic devices.

REFERENCE SIGNS LIST

10 liquid crystal display panel
20 signal converter
21 color coordinate transformation section
22 lookup table memory
23 arithmetic section
100 liquid crystal display device
R red subpixel
G green subpixel
B blue subpixel
Ye yellow subpixel
C cyan subpixel

The invention claimed is:

1. A liquid crystal display device comprising a pixel which is defined by a plurality of subpixels,
   wherein the plurality of subpixels includes red, green, blue and yellow subpixels,
   as long as the sum of respective luminances of all of the subpixels but the blue subpixel falls within the range of 0% to 50% while the color displayed by the pixel is changing from the color blue in which the blue subpixel is at the highest grayscale level and the other subpixels are at the lowest grayscale level into the color white in which all of those subpixels are at the highest grayscale level substantially without changing its hue,
   the yellow subpixel starts to increase its grayscale level at a different timing, and/or has its grayscale level increased at a different ratio with respect to an increase in the pixel's luminance, from the red and green subpixels do.

2. The liquid crystal display device of claim 1, wherein while the color displayed by the pixel is changing from the color blue into the color white substantially without changing its hue,
   the red and green subpixels start to increase their grayscale levels at an earlier timing than the yellow subpixel starts to increase its own.

3. The liquid crystal display device of claim 2, wherein the sum of respective luminances of the red and green subpixels which are at the highest grayscale level is lower than the luminance of the yellow subpixel which is at the highest grayscale level.

4. The liquid crystal display device of claim 2, wherein while the color displayed by the pixel is changing from the color blue into the color white substantially without changing its hue,
   the red and green subpixels increase their grayscale levels at the same ratio with respect to an increase in the pixel's luminance.

5. The liquid crystal display device of claim 4, wherein while the color displayed by the pixel is changing from the color blue into the color white substantially without changing its hue,
   the yellow subpixel starts to increase its grayscale level after the red and green subpixels have reached the highest grayscale level.

6. The liquid crystal display device of claim 4, wherein while the color displayed by the pixel is changing from the color blue into the color white substantially without changing its hue,
   the yellow subpixel starts to increase its grayscale level before the red and green subpixels reach the highest grayscale level.

7. The liquid crystal display device of claim 2 or 3, wherein while the color displayed by the pixel is changing from the color blue into the color white substantially without changing its hue,
   the red and green subpixels increase their grayscale levels at mutually different ratios with respect to an increase in the pixel's luminance.

8. The liquid crystal display device of claim 7, wherein while the color displayed by the pixel is changing from the color blue into the color white substantially without changing its hue,
   the yellow subpixel starts to increase its grayscale level after one of the red and green subpixels has reached the highest grayscale level and before the other subpixel reaches the highest grayscale level.

9. The liquid crystal display device of claim 2, wherein the plurality of subpixels further includes a cyan subpixel, and
   while the color displayed by the pixel is changing from the color blue into the color white substantially without changing its hue,
   the cyan subpixel starts to increase its grayscale level at the same timing as the red and green subpixels start to increase theirs, and
   the cyan subpixel increases its grayscale level at a different ratio with respect to an increase in the pixel's luminance from the red and green subpixels.

10. The liquid crystal display device of claim 1, wherein while the color displayed by the pixel is changing from the color blue into the color white substantially without changing its hue,
    the yellow subpixel start to increase its grayscale level at an earlier timing than the red and green subpixels start to increase theirs.

11. The liquid crystal display device of claim 10, wherein the luminance of the yellow subpixel which is at the highest grayscale level is lower than the sum of respective luminances of the red and green subpixels which are at the highest grayscale level.

12. The liquid crystal display device of claim 10, wherein while the color displayed by the pixel is changing from the color blue into the color white substantially without changing its hue,
- the red and green subpixels start to increase their grayscale levels after the yellow subpixel has reached the highest grayscale level.

13. The liquid crystal display device of claim 12, wherein while the color displayed by the pixel is changing from the color blue into the color white substantially without changing its hue,
- the red and green subpixels increase their grayscale levels at the same ratio with respect to an increase in the pixel's luminance.

14. The liquid crystal display device of claim 10, wherein while the color displayed by the pixel is changing from the color blue into the color white substantially without changing its hue,
- at least one of the red and green subpixels starts to increase their grayscale levels before the yellow subpixel reaches the highest grayscale level.

15. The liquid crystal display device of claim 14, wherein while the color displayed by the pixel is changing from the color blue into the color white substantially without changing its hue,
- one of the red and green subpixels starts to increase its grayscale level before the yellow subpixel reaches the highest grayscale level, and the other subpixel starts to increase its grayscale level after the yellow subpixel has reached the highest grayscale level.

16. The liquid crystal display device of claim 14, wherein while the color displayed by the pixel is changing from the color blue into the color white substantially without changing its hue,
- both of the red and green subpixels start to increase their grayscale levels before the yellow subpixel reaches the highest grayscale level, and the red and green subpixels increase their grayscale levels at the same ratio with respect to an increase in the pixel's luminance.

17. The liquid crystal display device of claim 9, wherein the plurality of subpixels further includes a cyan subpixel, and while the color displayed by the pixel is changing from the color blue into the color white substantially without changing its hue,
- the cyan and yellow subpixels start to increase their grayscale levels at the same timing, and
- the cyan subpixel increases its grayscale level at a different ratio with respect to an increase in the pixel's luminance from the yellow subpixel.

18. The liquid crystal display device of claim 1, wherein while the color displayed by the pixel is changing from the color blue into the color white substantially without changing its hue,
- the yellow subpixel starts to increase its grayscale level at the same timing as the red and green subpixels start to increase theirs, and
- the yellow subpixel stops increasing its grayscale level once after having started increasing its own.

19. The liquid crystal display device of claim 1, wherein while the color displayed by the pixel is changing from the color blue into the color white substantially without changing its hue,
- the yellow subpixel starts to increase its grayscale level at the same timing as the red and green subpixels start to increase theirs, and
- the red and green subpixels stop increasing their grayscale levels once after having started increasing theirs.

20. A liquid crystal display device comprising a pixel which is defined by a plurality of subpixels,
- wherein the plurality of subpixels includes red, green, blue and yellow subpixels,
- while the color displayed by the pixel changes from the color blue in which the blue subpixel is at the highest grayscale level and the other subpixels are at the lowest grayscale level into the color white in which all of those subpixels are at the highest grayscale level substantially without changing its hue,
- the yellow subpixel starts to increase its grayscale level at a different timing from the red and green subpixels.

\* \* \* \* \*